United States Patent
Kibino et al.

(10) Patent No.: US 6,303,714 B1
(45) Date of Patent: Oct. 16, 2001

(54) CATALYST COMPONENT FOR OLEFIN POLYMERIZATION CATALYST FOR OLEFIN POLYMERIZATION, AND PROCESS FOR PREPARING POLYOLEFIN

(75) Inventors: Nobuyuki Kibino; Kiyotaka Ishida; Tsugihiko Hakozaki; Tsutomu Sakuragi; Shigenobu Miyake; Shintaro Inazawa, all of Oita (JP)

(73) Assignee: Japan Polyolefins Co., Ltd., Tokyo (JP)

( * ) Notice: Subject to any disclaimer, the term of this patent is extended or adjusted under 35 U.S.C. 154(b) by 0 days.

(21) Appl. No.: 09/242,664

(22) PCT Filed: Aug. 20, 1997

(86) PCT No.: PCT/JP97/02880

§ 371 Date: Feb. 22, 1999

§ 102(e) Date: Feb. 22, 1999

(87) PCT Pub. No.: WO98/07761

PCT Pub. Date: Feb. 26, 1998

(30) Foreign Application Priority Data

Aug. 21, 1996 (JP) .................................................... 8-220207
Jun. 3, 1997 (JP) .................................................... 9-144967

(51) Int. Cl.⁷ ................................. C08F 4/44; C08F 4/16
(52) U.S. Cl. .......................... 526/116; 526/160; 526/161; 526/943; 502/104; 502/153; 502/155
(58) Field of Search .................................... 526/160, 161, 526/170, 172, 348.6, 352, 116; 502/104, 117, 153, 155

(56) References Cited

U.S. PATENT DOCUMENTS 6,107,232 * 8/2000 Yokota ................................. 502/155

FOREIGN PATENT DOCUMENTS

| 0 675 138 | 10/1995 | (EP) . |
|---|---|---|
| 0 763 550 A1 * | 3/1997 | (EP) . |
| 56-90810 | 7/1981 | (JP) . |
| 60-106806 | 6/1985 | (JP) . |
| 03-203904 | 9/1991 | (JP) . |
| 05-155932 | 6/1993 | (JP) . |
| 05-255436 | 10/1993 | (JP) . |
| 06-206922 | 7/1994 | (JP) . |
| 06-206923 | 7/1994 | (JP) . |
| 09-3113 | 1/1997 | (JP) . |
| 09-124722 | 5/1997 | (JP) . |
| 09-143221 | 6/1997 | (JP) . |

OTHER PUBLICATIONS

Gomez et al., Mono–N–Cyclopentadienyl–Benzamidinato Chloro Compounds of Ti, Zr and Hf, JOML 491 (1995) 153–158, Apr. 1995.*

Chandra, Girish et al: "Amido derivatives of metals and metalloids. X. Reactions of titanium (IV), zirconium (IV), and hafnium (IV) amides with unsaturated substrates, and some related experiments with amides of boron, silicon, germanium, and tin (IV)", J. Chem. Soc. A (1970), (15), 2550–8, XP000907104, p. 2552, column 1, paragraph 4; example IX, p. 2556, paragraphs 1,2.

Cotton, F. Albert et al: "Two new titanium complexes with N,N'–diphenylformamidinate (DPhF–), Ti (DPhF)3 and Ti2(.mu.–DPhF)2(DPhF)2(.mu.–NPh)2" Polyhedron (1994), 13(9), 1337–41, XP000910318.

Cotton, F. Albert et al: "Dinuclear compounds of titanium (III) and zirconium (III), with and without metal–metal bonds", Gazz. Chim. Ital. (1993), 123(9), 499–507, XP000910450.

Karsch, Hans H. et al: "Zirconium complexes with phosphinomethanide ligands: syntheses, reactivity, and x–ray structure determinations" Organometallics (1994), 13(2), 610–18, XP000910314.

* cited by examiner

Primary Examiner—David W. Wu
Assistant Examiner—R. Harlan
(74) Attorney, Agent, or Firm—Sughrue, Mion, Zinn, Macpeak & Seas, PLLC

(57) ABSTRACT

The present invention provides an olefin polymerization catalyst component comprising a transition metal compound represented by general formula (1)

$$L_m Cp_n MX^1 X^2 \qquad (1)$$

an olefin polymerization catalyst containing the catalyst component as a transition metal component, and a method of producing a polyolefin using the catalyst. According to the present invention, polyolefins having a wide molecular weight distribution and excellent moldability and containing small amounts of low molecular weight components can be produced with high activity.

11 Claims, No Drawings

CATALYST COMPONENT FOR OLEFIN POLYMERIZATION CATALYST FOR OLEFIN POLYMERIZATION, AND PROCESS FOR PREPARING POLYOLEFIN

TECHNICAL FIELD

The present invention relates to an olefin polymerization catalyst component, an olefin polymerization catalyst, and a method of producing polyolefin using the catalyst. More particularly, the present invention relates to an olefin polymerization catalyst and a method of producing polyolefin using the catalyst, which catalyst has a high activity and enables one to obtain polyolefins having a wide molecular weight distribution and an excellent moldability and containing smaller amounts of low molecular weight components.

BACKGROUND OF THE INVENTION

A catalyst composed of a mixture of a metallocene compound and an organic aluminum oxy compound has been widely known as a homogeneous catalyst for polymerizing olefins. There have been made reports on olefin polymerization catalysts composed of various metallocene compounds and linear or cyclic organic aluminum oxy compounds, for example, in Japanese Patent Application Laid-open No. 19309/1983 (European Patent No. 69951), Japanese Patent Application Laid-open No. 35007/1985 (European Patent No. 129368, U.S. Pat. No. 5,324,800), Makromol. Chem., Rapid Commun. 9, 457–461 (1988), etc. However, the biscyclopentadienyl complex base catalysts used in the prior art do not give high molecular weight polyolefins when the polymerization is run at reaction temperatures of 50 to 200° C., which are efficient in industrial processes.

Japanese Patent Application Laid-open No. 2917/1995 reports that high molecular weight polyolefins are obtained by use of an amidinato complex having a trimethylsilyl group on its nitrogen atom, specific examples of which include:

bis(N,N'-bis(trimethylsilyl)benzamidinato)zirconium dichloride, bis(N,N'-bis(trimethylsilyl)benzamidinato)zirconium ditriflate, (cyclopentadienyl)(N,N'-bis(trimethylsilyl)benzamidinato)titanium dichloride, (cyclopentadienyl)(N,N'-bis(trimethylsilyl)benzamidinato)zirconium chloride, and (pentamethylcyclopentadienyl)(N,N'-bis(trimethylsilyl)benzamidinato)titanium dichloride.

However, these catalyst systems have low polymerization activities and are unsatisfactory for industrial production. Therefore, catalysts systems are desired which have high activities at reaction temperatures that are efficient in industrial processes and allowing production of high molecular weight polyolefins.

Also, it has been known that in order to increase moldability of ethylene base polymers, their melt tension needs be increased. For this purpose, study has been made on the improvement of the melt tension of ethylene base polymers with titanium base catalysts or chromium base catalysts of the Ziegler type. For example, a method of improving the moldability of ethylene base polymers obtained by a titanium catalyst of the Ziegler type by increasing their melt tension was disclosed (Japanese Patent Application Laid-open No. 90810/1981, Japanese Patent Application Laid-open No. 106806/1985).

Although the ethylene base copolymers obtained using titanium base catalysts or chromium base catalysts generally have improved melt tensions, they have a wide molecular weight distribution and contain large amounts of low molecular weight components (as evaluated by extraction with hexane) so that causes smoking when molding and molded articles tend to be sticky.

On the other hand, there has been known a method of producing polyethylene and ethylene-α-olefin copolymers using a metallocene catalyst composed of a metallocene compound and methylaluminoxane. The ethylene base polymers obtained by this method have a narrow molecular weight distribution and contain small amounts of low molecular weight components so that the problem of causing smoking when molding is solved but the problem of moldability remains because of their low melt tension.

In order to solve this problem, a study has been made on the use of two types of metallocene compounds in a metallocene catalyst system to improve the melt tension of a resulting polymer. For example, a method of producing polyethylene or ethylene-α-olefin copolymers has been disclosed which uses a combination of a metallocene complex having a non-crosslinking ligand and a metallocene complex having a crosslinking ligand with aluminoxane and optionally a carrier and an organic aluminum compound (Japanese Patent Application Laid-open No. 203904/1991, Japanese Patent Application Laid-open No. 213305/1992 (European Patent No. 452920)).

Further, Japanese Patent Application Laid-open No. 255436/1993, Japanese Patent Application Laid-open No. 255437/1993 (European Patent No. 515132), Japanese Patent Application Laid-open No. 155932/1993, and Japanese Patent Application Laid-open No. 155933/1993 (European Patent No. 516458) disclose methods of producing polyethylene or ethylene-α-olefin copolymers which use of a catalyst system composed of two types of metallocene complexes in combination with aluminoxane and optionally an organic aluminum compound or a catalyst system obtained by prepolymerizing this catalyst.

Further, Japanese Patent Application Laid-open No. 206922/1994, Japanese Patent Application Laid-open No. 206923/1994, and Japanese Patent Application Laid-open No. 206924/1994 (European Patent No. 598628) disclose methods of producing polyethylene or ethylene-a-olefin copolymers which use of a catalyst system composed of two types of transition metal compound complexes having at least two alkyl-substituted cyclopentadienyl ligands in combination with aluminoxane and optionally a carrier and an organic aluminum compound or a catalyst system obtained by prepolymerizing this catalyst.

The ethylene base copolymers obtained by these methods have narrow comonomer distributions and contain smaller amounts of low molecular weight components so that smoking when molding is reduced and stickiness of molded articles is also improved. However, the improvement of moldability is insufficient.

Accordingly, if a method of producing at high activities an ethylene base polymer is established which has a high melt tension strength and excellent moldability, contains smaller amounts of low molecular weight components, and is free of the problem of causing smoking when molding, then such method will have a high industrial value.

Therefore, it is an object of the present invention to provide a catalyst system which has a high activity at reaction temperatures efficient for industrial processes and enables one to produce high molecular weight polyolefins.

Another object of the present invention is to provide a catalyst and a method of producing polyolefins using the catalyst, which catalyst is capable of producing polyolefin that has a wide molecular weight distribution and an excellent moldability and contains smaller amounts of low molecular weight components.

DISCLOSURE OF THE INVENTION

The present inventors have made intensive investigation to solve the above-described problems and as a result have discovered that a catalyst comprising a specified transition metal compound and an organic aluminum oxy compound or a compound which forms an ion pair with the transition metal compound can be used as a novel catalyst for the polymerization of olefins having the activity that meets the above-described objects, thus completing the present invention.

That is, the present invention provides the olefin polymerization catalyst component, the olefin polymerization catalyst containing the catalyst component, and the method of producing a polyolefin using the catalyst as described below.

1. An olefin polymerization catalyst component comprising a transition metal compound represented by general formula (1)

 (1)

[wherein M is a transition metal atom of Group 4 in a periodic table,

L is a group represented by general formula (2)

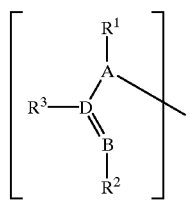 (2)

(wherein $R^1$ and $R^2$, which may be the same or different, each represent an aryl group or a substituted aryl group, A and B, which may be the same or different, each represent an atom of Group 15 of the periodic table, D represents an atom of Group 14 of the periodic table, A is bonded to M, B is coordinated to M through a lone electron pair or through a resonance when M, A, D and B are resonant among them, $R^3$ represents a hydrogen atom, a halogen atom, an organic metalloid group, an alkoxy group, an amino group, a hydrocarbon group or a hetero atom-containing hydrocarbon group), Cp represents a cyclopentadienyl group, a substituted cyclopentadienyl group, an indenyl group, a substituted indenyl group, a fluorenyl group, or a substituted fluorenyl group, m is 1 or 2, n is 1 when m is 1 or 0 when m is 2, when m is 1, the L group and the Cp group may be crosslinked to each other, when m is 2, the L groups may be crosslinked to each other, $X^1$ and $X^2$, which may be the same or different, each represent a hydrogen atom, a halogen atom, an organic metalloid group, an alkoxy group, an amino group, a hydrocarbon group, or a hetero atom-containing hydrocarbon group].

2. An olefin polymerization catalyst comprising:
(A) a transition metal compound (A-1) represented by general formula (1) described in 1 above, and
(B) at least one compound selected from the group consisting of an organic aluminum oxy compound (B-1) and a compound (B-2) which reacts with the transition metal compound represented by general formula (1) described above to form an ion pair.

3. An olefin polymerization catalyst comprising:
(A-1) a transition metal compound (A-1) represented by general formula (1) described in 1 above, and
(A-2) at least one transition metal compound selected from the group consisting of a transition metal compound (A-2a) represented by general formula (3)

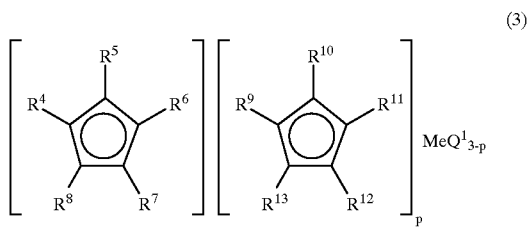 (3)

[wherein $R^4$ to $R^{13}$, which may be the same or different, each represent a hydrogen atom, a $C_{1-20}$ hydrocarbon group, a silyl group substituted with 1 to 3 alkyl groups, or a germyl group substituted with 1 to 3 alkyl groups, or two adjacent groups together with the carbon atom to which they are combined form a 4 to 6 member carbocyclic group, a plurality of $(Q^1)$s, which may be the same or different, each represent a hydrogen atom, a halogen atom, a $C_{1-20}$ hydrocarbon group, an alkoxy group, an aryloxy group, a silyloxy group which may be substituted with 1 to 3 alkyl groups, or a substituted alkyl group containing 1 to 30 carbon atoms of which at least one carbon atom in the skeleton is replaced with an element selected from the group consisting of atoms of Groups 13, 14 and 16 in the periodic table, Me represents a transition metal selected from the group consisting of atoms of Group 3, 4, 5, and 6 in the periodic table, and p is 0 or 1], and (A-2b) a transition metal compound represented by general formula (4)

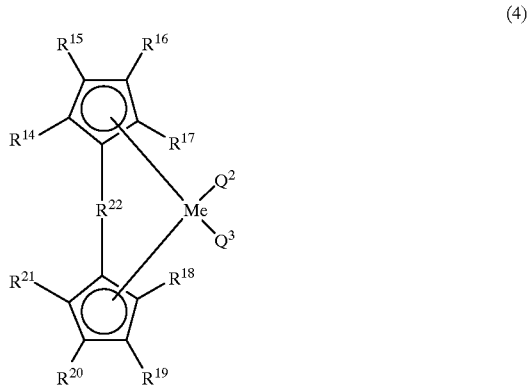 (4)

[wherein $R^{14}$ to $R^{21}$, which may be the same or different, each represent a hydrogen atom, a $C_{1-20}$ hydrocarbon group, a silyl group substituted with 1 to 3 alkyl groups, or a germyl group substituted with 1 to 3 alkyl groups, $R^{22}$ represents an alkylene group, an alkylidene group, a cycloalkylidene group in which one of ring forming carbons may be replaced by an oxygen atom, a di-substituted germylene or silylene group, disubstituted with an alkyl group or a phenyl group, $Q^2$ and $Q^3$, which may be the same or different, each represent a hydrogen atom, a halogen atom, a $C_{1-20}$ hydrocarbon group, an alkoxy group, an aryloxy group, a silyloxy group which may be substituted with 1 to 3 alkyl groups, or a substituted alkyl group containing 1 to 30 carbon atoms of which at least one carbon atom in the skeleton is replaced with an element selected from the group consisting of atoms of Groups 13, 14 and 16 in the periodic table, Me represents a transition metal selected from the group consisting of atoms of Group 3, 4, 5, and 6], and (B) at least one compound selected from (B-1) an organic aluminum oxy compound, and (B-2') a compound which reacts with the transition compound represented by general formulae (1), (3), or (4) above to form an ion pair.

4. The olefin polymerization catalyst as described in 2 or 3 above, further comprising (C) at least one organic metal compound selected from the group consisting of an organic lithium, an organic magnesium, and an organic aluminum.

5. The olefin polymerization catalyst as described in 2 or 3 above, further comprising (D) a carrier.

6. The olefin polymerization catalyst as described in 2 or 3 above, further comprising (C) at least one organic metal compound selected from the group consisting of an organic lithium, an organic magnesium, and an organic aluminum and (D) a carrier.

7. A method of producing a polyolefin, comprising using a catalyst as described in any one of 2 through 6 above.

DETAILED DESCRIPTION OF THE INVENTION

Hereafter, the olefin polymerization catalyst component, olefin polymerization catalyst containing the component, and the method of producing a polyolefin using the catalyst will be described concretely.

The olefin polymerization catalyst component (A-1) is a transition metal compound represented by general formula (1) below.

wherein M is a transition metal of Group 4 in a periodical table (Group is according to 1990 Rules of Inorganic Chemistry Nomenclature; hereafter, the same) and more specifically, titanium, zirconium or hafnium. Preferred is zirconium.

L is a group represented by general formula (2)

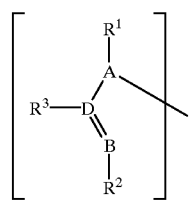

(In the above formula, $R^1$ and $R^2$, which may be the same or different, each represent an aryl group or a substituted aryl group.

A and B, which may be the same or different, each represent an atom of Group 15 of the periodic table. More specifically nitrogen, phosphorus, arsenic, antimony, or the like, preferably nitrogen or phosphorus.

D represents an atom of Group 14 of the periodic table, preferably carbon.

A is bonded to M,

B is coordinated to M through a lone electron pair or through a resonance when M, A, D and B are resonant among them.

$R^3$ represents a hydrogen atom, a halogen atom, an organic metalloid group, an alkoxy group, an amino group, a hydrocarbon group or a hetero atom-containing hydrocarbon group.)

Cp represents a cyclopentadienyl group, a substituted cyclopentadienyl group, an indenyl group, a substituted indenyl group, a fluorenyl group, or a substituted fluorenyl group.

m is 1 or 2, n is 1 when m is 1 or 0 when m is 2. When m is 1, the L group and the Cp group may be crosslinked to each other, and when m is 2, the L groups may be crosslinked to each other.

$X^1$ and $X^2$, which may be the same or different, each represent a hydrogen atom, a halogen atom, an organic metalloid group, an alkoxy group, an amino group, a hydrocarbon group, or a hetero atom-containing hydrocarbon group.

In the present invention, it is important for high activity and obtaining high molecular weight polyolefins that $R^1$ and $R^2$ are each an aryl group or a substituted aryl group. As for the substituent for the aryl group, there can be cited a halogen atom and an alkyl group. Preferred examples of $R^1$ and $R^2$ include a phenyl group, a fluorophenyl group, a trifluorophenyl group, a methylphenyl group, a 2,6-dimethylphenyl group, a naphthyl group, a fluoronaphthyl group, an anthracenyl group, and the like. Particularly preferred are a phenyl group and a naphthyl group. Further, as for $R^3$, a hydrogen atom, an alkyl group or a (substituted) aryl group are preferred.

Hereafter, specific compounds of the transition metal compound represented by general formula (1) where M is zirconium will be described by way of example.

(Pentamethylcyclopentadienyl)(N,N'-bis(phenyl) benzamidinato)zirconium dichloride, (Cyclopentadienyl)(N,N'-bis(phenyl)benzamidinato) zirconium dichloride, (n-Propylcyclopentadienyl)(N,N'-bis(phenyl) benzamidinato)zirconium dichloride, (n-Butylcyclopentadienyl)(N,N'-bis(phenyl) benzamidinato)zirconium dichloride, (Indenyl)(N,N'-bis(phenyl)benzamidinato)zirconium dichloride, (Trimethylindenyl)(N,N'-bis(phenyl)benzamidinato) zirconium dichloride, (Pentamethylcyclopentadienyl)(N,N'-bis(fluorophenyl) benzamidinato)zirconium dichloride, (Pentamethylcyclopentadienyl)(N,N'-bis (trifluoromethylphenyl)benzamidinato)zirconium dichloride, (Pentamethylcyclopentadienyl)(N,N'-bis(2,6-dimethylphenyl)benzamidinato)zirconium dichloride, (Pentamethylcyclopentadienyl)(N,N'-bis(naphthyl) benzamidinato)zirconium dichloride, (Pentamethylcyclopentadienyl)(N,N'-bis(fluoronaphthyl)
benzamidinato)zirconium dichloride,
(Cyclopentadienyl)(N,N'-bis(naphthyl)benzamidinato)
zirconium dichloride,
(Cyclopentadienyl)(N,N'-bis(fluoronaphthyl)
benzamidinato)zirconium dichloride,
(Cyclopentadienyl)(N,N'-bis(anthracenyl)benzamidinato)
zirconium dichloride,
(Pentamethylcyclopentadienyl)(N,N'-bis(anthracenyl)
benzamidinato)zirconium dichloride,
Bis(N,N'-bis(phenyl)benzamidinato)zirconium
dichloride,
Bis(N,N'-bis(naphthyl)benzamidinato)zirconium
dichloride,
Bis(N,N'-bis(anthracenyl)benzamidinato)zirconium
dichloride,
Bis(N,N'-bis(fluorophenyl)benzamidinato)zirconium
dichloride,
Bis(N,N'-bis(methylphenyl)benzamidinato)zirconium
dichloride,
Dimethylsilylene(cyclopentadienyl)(N,N'-bis(phenyl)
amidinato)zirconium dichloride,
Dimethylsilylene(tetramethylcyclopentadienyl)(N,N'-bis
(phenyl)amidinato)zirconium dichloride,
Dimethylsilylene(n-butylcyclopentadienyl)(N,N'-bis
(phenyl)amidinato)zirconium dichloride,
Dimethylsilylene(indenyl)(N,N'-bis(phenyl)amidinato)
zirconium dichloride,
Bis(N,N'-bis(phenyl)benzamidinato)zirconium
dichloride,
Dimethylsilylenebis(N,N'-bis(phenyl)benzamidinato)
zirconium dichloride
Isopropylidenebis(N,N'-bis(phenyl)benzamidinato)
zirconium dichloride, and the like.

Preferred are (pentamethylcyclopentadienyl)(N,N'-bis
(phenyl)benzamidinato)zirconium dichloride and bis(N,N'-
bis(phenyl)benzamidinato)zirconium dichloride.

There can also be cited those compounds which are
obtained by substituting zirconium by hafnium or titanium
in the above-described zirconium compounds but are not
limited thereto.

While the catalyst of the present invention may contain as
the transition metal component the compound (A-1) represented by general formula (1) above alone, at least one
compound (A-2) selected from a transition metal compound
(A-2a) represented by general formula (3) and a transition
metal compound (A-2b) represented by general formula (4)
may be used as another transition metal component in
combination.

(3)

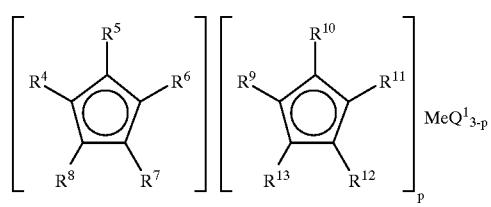

The symbols in general formula (3) above have the
following meanings.

$R^4$ to $R^{13}$, which may be the same or different, each
represent a hydrogen atom, a $C_{1-20}$ hydrocarbon group, a
silyl group substituted with 1 to 3 alkyl groups, or a germyl
group substituted with 1 to 3 alkyl groups, or two adjacent
groups together with the carbon atom to which they are
combined form a 4 to 6 member carbocyclic group.

Two or three ($Q^1$)s, which may be the same or different,
each represent a hydrogen atom, a halogen atom, a $C_{1-20}$
hydrocarbon group, an alkoxy group, an aryloxy group, a
silyloxy group which may be substituted with 1 to 3 alkyl
groups, or a substituted alkyl group containing 1 to 30
carbon atoms of which at least one carbon atom in the
skeleton is replaced with an element selected from the group
consisting of atoms of Groups 13, 14 and 16 in the periodic
table.

Me represents a transition metal selected from the group
consisting of atoms of Group 3, 4, 5, and 6 in the periodic
table. p is 0 or 1.

(4)

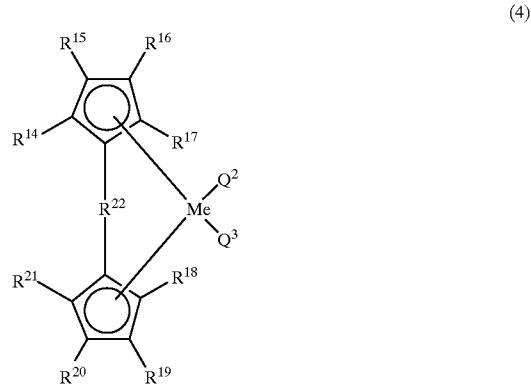

The symbols in general formula (4) have the following
meanings.

$R^{14}$ to $R^{21}$, which may be the same or different, each
represent a hydrogen atom, a $C_{1-20}$ hydrocarbon group, a
silyl group substituted with 1 to 3 alkyl groups, or a germyl
group substituted with 1 to 3 alkyl groups.

$R^{22}$ represents an alkylene group, an alkylidene group, a
cycloalkylidene group in which one of ring forming carbons
may be replaced by an oxygen atom, a di-substituted germylene or silylene group, disubstituted with an alkyl group
or a phenyl group.

$Q^2$ and $Q^3$, which may be the same or different, each
represent a hydrogen atom, a halogen atom, a $C_{1-20}$ hydrocarbon group, an alkoxy group, an aryloxy group, a silyloxy
group which may be substituted with 1 to 3 alkyl groups, or
a substituted alkyl group containing 1 to 30 carbon atoms in
which at least one carbon atom in the skeleton is replaced
with an element selected from the group consisting of atoms
of Groups 13, 14 and 16 in the periodic table.

Me represents a transition metal selected from the group
consisting of atoms of Group 3, 4, 5, and 6 in the periodic
table.

In general formula (3) or (4) above, Me is a transition
metal selected from Group 3, 4, 5 and 6 in a periodic table,
preferably a metal selected from the transition metal compounds of Group 4, that is, titanium, zirconium, and
hafnium. Particularly preferred is zirconium or hafnium.

In general formula (3) above, examples of the $C_{1-20}$
hydrocarbon group represented by $R^4$ to $R^{13}$ include alkyl
groups such as a methyl group, an ethyl group, a propyl
group, a butyl group, an isobutyl group, a t-butyl group, an
amyl group, an isoamyl group, a hexyl group, a heptyl
group, an octyl group, a nonyl group, a decyl group, and a
cetyl group, cycloalkyl groups such as a cyclopentyl group and a cyclohexyl group, alkenyl groups such as a vinyl group and a propenyl group, aryl groups such as a phenyl group and a tolyl group, alkylaryl groups such as a 2,6-dimehtylphenyl group and a 2,4,6-trimethylphenyl group, and the like. Examples of the silyl group substituted with 1 to 3 alkyl groups include a trimethylsilyl group and the like. Examples of the germyl group substituted with 1 to 3 alkyl groups include a trimethylgermyl group and the like. In the case where two adjacent groups together with the carbon atom to which they are bonded form a 4- to 6-membered carbocyclic group, examples of the cyclopentadienyl ring include an indenyl ring, a fluorenyl ring and the like.

Ligands having one or more of the above-described substituents

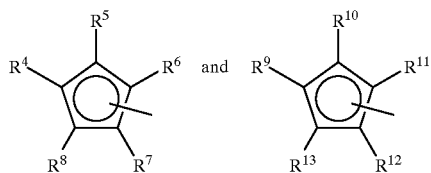

include alkyl-substituted cyclopentadienyl groups such as a cyclopentadienyl group, a methylcyclopentadienyl group, an ethylcyclopentadienyl group, a n-butylcyclopentadienyl group, a t-butylcyclopentadienyl group, a trimethylsilylcyclopentadienyl group, a dimethylcyclopentadienyl group, and a pentamethylcyclopentadienyl group, and an indenyl group and a fluorenyl group having or not-having the same substituents above.

In general formula (4) above, $C_{1-20}$ hydrocarbon group, silyl group substituted with 1 to 3 alkyl groups, or germyl group substituted with 1 to 3 alkyl groups represented by $R^{14}$ to $R^{21}$ may be the same as those exemplified for $R^4$ to $R^{13}$ above.

Ligands having one or more of the above-described substituents

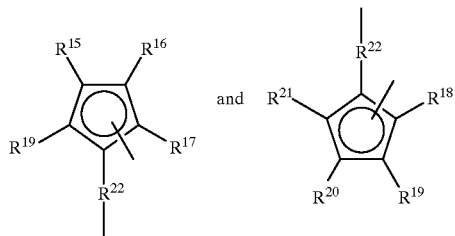

include alkyl-substituted cyclopentadienyl groups such as a cyclopentadienyl group, a methylcyclopentadienyl group, an ethylcyclopentadienyl group, a n-butylcyclopentadienyl group, a t-butylcyclopentadienyl group, a trimethylsilylcyclopentadienyl group, a dimethylcyclopentadienyl group, and a tetramethylcyclopentadienyl group.

In general formula (4) above, the alkylene group represented by $R^{22}$ includes a methylene group, an ethylene group, a propylene group, a diphenylmethylene group, and the like. The alkylidene group and the cycloalkylidene group in which one of ring forming carbon atoms may be replaced by an oxygen atom include an ethylidene group, an isopropylidene group, a cyclopentylidene group, a cyclohexylidene group, a tetrahydropyran-4-ylidene group, and the like. Further, the di-substituted germylene or di-substituted silylene group di-substituted with an alkyl group or a phenyl group includes a dimethylsilylene group, a diphenylsilylene group, a dimethylgermylene group, a diphenylgermylene group, and the like.

The $C_{1-20}$ hydrocarbon groups represented by the up to three $(Q^1)$s in general formula (3) above and $Q^2$ and $Q^3$ in general formula (4) above, which may be the same or different, may be the same as those exemplified for $R^4$ to $R^{13}$ above. Specific examples of the halogen atom include a fluorine atom, a chlorine atom, a bromine atom, and an iodine atom. The substituted alkyl group which contains 1 to 30 carbon atoms and of which at least one carbon atom in the skeleton is replaced by an atom selected from the group consisting of atoms of Group 13, 14 and 16 in the periodic table includes a bis(trimethylsilyl)methyl group, a methoxymethyl group, an ethoxymethyl group, and the like.

Hereafter, specific examples of the transition metal compound (A-2a) and (A-2b) represented by general formula (3) and (4) when Me is zirconium are indicated below.

The transition metal compound (A-2a) represented by general formula (3) includes:

Biscyclopentadienylzirconium dichloride,
Bis(methylcyclopentadienyl)zirconium dichloride,
Bis(n-butylcyclopentadienyl)zirconium dichloride,
Bis(n-butylcyclopentadienyl)zirconium dimethyl,
Bis(1,3-dimethylcyclopentadienyl)zirconium dichloride,
Bis(pentamethylcyclopentadienyl)zirconium dichloride,
Bis(pentamethylcyclopentadienyl)zirconium bis(bis(trimethylsilyl)methyl),
Bis(pentamethylcyclopentadienyl)zirconium di(methoxymethyl),
(Cyclopentadienyl)(methylcyclopentadienyl)zirconium dichloride,
(Cyclopentadienyl)(n-butylcyclopentadienyl)zirconium dichloride,
(Cyclopentadienyl)(indenyl)zirconium dichloride,
(Cyclopentadienyl)(fluorenyl)zirconium dichloride,
Cyclopentadienylzirconium trichloride,
Cyclopentadienylzirconium trimethyl,
Pentamethylcyclopentadienylzirconium trichloride,
Pentamethylcyclopentadienylzirconium trimethyl, and the like.

The transition metal compound (A-2b) represented by general formula (4) above includes:

Dimethylsilylenebis(cyclopentadienyl)zirconium dichloride,
Dimethylsilylenebis(methylcyclopentadienyl)zirconium dichloride,
Dimethylsilylenebis(n-butylcyclopentadienyl)zirconium dichloride,
Dimethylsilylenebis (n-butylcyclopentadienyl)zirconium bis(bis(trimethylsilyl)methyl),
Isopropylidenebis(methylcyclopentadienyl)zirconium dichloride,
Isopropylidenebis(n-butylcyclopentadienyl)zirconium dichloride, and the like.

Also, there can be cited those transition metal compounds which are obtained by substituting zirconium in the above described zirconium compounds by hafnium or titanium.

Among them, bis(n-butylcyclopentadienyl)zirconium dichloride and dimethylsilylenebis(n-butylcyclopentadienyl)zirconium dichloride are preferred.

When the transition metal compound (A-1) represented by general formula (1) above and at least one compound (A-2) selected from the transition metal compounds represented by general formulae (3) or (4) above are used in combination, preferred specific combinations thereof are a combination of bis(n-butylcyclopentadienyl)zirconium dichloride and (pentamethylcyclopentadienyl)(N,N'-bis(phenyl)benzamidinato)zirconium dichloride and a combination of dimethylsilylenebis(n-butylcyclopentadienyl)zirconium dichloride and (pentamethylcyclopentadienyl)(N,N'-bis(phenyl)benzamidinato)zirconium dichloride.

Proportion in which they are blended ranges from 99/1 to 10/90, preferably from 95/5 to 20/80, more preferably from 93/7 to 30/70, and most preferably from 90/10 to 40/60 as molar ratio of (A-1) to (A-2)((A-1)/(A-2)).

The second component (B) in the olefin polymerization catalyst of the present invention is at least one compound selected from the group consisting of the organic aluminum oxy compound (B-1) and the compound (B-2) which reacts with the transition metal compound represented by general formula (1) above to form an ion pair. Also, in the case where there is used as a transition metal component the transition metal compound (A-2) represented by general formulae (3) or (4) above is used in combination in addition to the transition metal compound (A-1) represented by general formula (1) above, at least one compound selected from the group consisting of the organic aluminum oxy compound (B-1) and a compound (B-2') which reacts with the transition compound represented by general formulae (1), (3), or (4) above to form an ion pair is used as the second component (B).

As the organic aluminum oxy compound, usually aluminoxane base compounds are used preferably.

The above-described aluminoxane is an organic aluminum compound represented by general formulae (5) or (6).

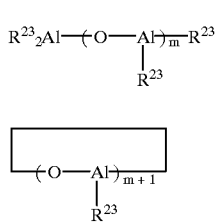

In the above formulae, $R^{23}$ is a hydrogen atom, a $C_{1-20}$ hydrocarbon group, a halogenated alkyl group or a halogenated aryl group. As the hydrocarbon group, there can be cited a methyl group, an ethyl group, a propyl group, a butyl group, an isobutyl group, and the like, preferably a methyl group and an isobutyl group. A plurality of $(R^{23})$s in the same formula may be different from each other; for example, they may be a moiety obtained by bonding repeating units having different hydrocarbon groups to each other blockwise, or regularly or irregularly. m is from 1 to 100, preferably 4 or more, and particularly preferably 8 or more.

A method for producing the compounds of the types described above is known. For example, there can be cited a method in which an organic aluminum compound is added to a suspension of salts with crystal water (copper sulfate hydrate, aluminum sulfate hydrates) in a hydrocarbon solvent and a method in which solid, liquid or gaseous water is acted to an organic aluminum compound in a hydrocarbon solvent.

In this case, there may be used as the aluminoxane two or more of the compounds represented by general formulae (5) or (6).

The organic aluminum compound which can be used in producing aluminoxane is selected from organic aluminums such as trimethylaluminum, triethylaluminum, tripropylaluminum, triisopropylaluminum, tri-n-butylaluminum, triisobutyl aluminum, tri-sec-butylaluminum, tri-tert-butylaluminum, tripentylaluminum, trihexylaluminum, trioctylaluminum, and tricyclohexylaluminum, dialkylaluminum halides such as dimethylaluminum chloride, diethylaluminum chloride, and diisobutylaluminum chloride, dialkylaluminum alkoxide such as dimethylaluminum methoxide and diethylaluminum ethoxide, and dialkylaluminum aryloxides such as diethylaluminum phenoxide, and the like.

Among them, trialkylaluminums, particularly trimethyl aluminum and triisobutylaluminum are preferred.

Examples of the hydrocarbon solvent used in producing aluminoxane include aromatic hydrocarbons such as benzene, toluene, and xylene, aliphatic hydrocarbons such as pentane, hexane, heptane, octane, and decane, alicyclic hydrocarbons such as cyclopentane and cyclohexane, and the like. Among these solvents, preferred are aromatic hydrocarbons.

Next, as the compound (B-2) which reacts with the transition metal compound represented by general formula (1) to form an ion pair or the compound (B-2') which reacts with the transition metal compound represented by general formulae (1), (3) and/or (4), there can be cited the Lewis acids, ionic compounds and carborane compounds described in Japanese Patent Application Laid-open No. 501950/1989 (WO88/05792), Japanese Patent Application Laid-open No. 502036/1989 (WO88/05793), Japanese Patent Application Laid-open No. 179005/1991 (European Patent No. 427697), Japanese Patent Application Laid-open No. 179006/1991 (European Patent No. 427696, U.S. Pat. No. 5,155,080, U.S. Pat. No. 5,225,500), Japanese Patent Application Laid-open No. 207703/1991 (European Patent No. 426637), Japanese Patent Application Laid-open No. 207704 (European Patent No. 426638), U.S. Pat. No. 547,718, etc.

Examples of the Lewis acids include triphenylboron, tris(4-fluorophenyl)boron, tris(o-tolyl)boron, tris(p-tolyl)boron, tris(3,5-dimethylphenyl)boron, tris(pentafluorophenyl)boron, $MgCl_2$, $Al_2O_3$, $SiO_2$—$AlO_3$, etc.

The ionic compounds include, for example, triphenylcarbenium tetrakis(pentafluorophenyl)borate, tri-n-butylammonium tetrakis(pentafluorophenyl)borate, N,N-dimethylanilinium tetrakis(pentafluorophenyl)borate, and ferrocenium tetrakis(pentafluorophenyl)borate.

The carborane compounds include dodecaborane, 1-carbaundecaborane, di-n-butylammonium (1-carbadodeca)borate, tri-n-butylammonium (tridecahydride-7-carbaundeca)borate, and the like.

The above-described component (B-2) or (B-2') may be used as a mixture of two or more of them.

The catalyst of the present invention may contain besides the above-described components (A-1), or mixed component of component (A-1) and component (A-2) (hereafter, referred to as component (A) en bloc) and component (B), at least one organic metal compound (C) selected from an organic lithium, an organic magnesium and an organic aluminum.

Specific examples of the organic lithium include methyllithium, ethyllithium, n-propyllithium, n-butyl lithium, isobutyllithium, sec-butyllithium, tert-butyllithium, n-pentyllithium, isopentyllithium, neopentyl lithium, and the like. Among these, preferred are n-butyl lithium and tert-butyllithium.

Specific examples of the organic magnesium include n-butylethylmagnesium, di-sec-butylmagnesium, n-butyl-sec-butylmagnesium, di-tert-butylmagnesium, dineopentyl magnesium, di-n-hexylmagnesium, and the like. Among these, preferred are n-butylethylmagnesium, di-sec-butylmagnesium, and di-n-hexylmagnesium.

Specific examples of the organic aluminum include trimethylaluminum, triethylaluminum, tripropylaluminum, triisopropylaluminum, tri-n-butylaluminum, triisobutyl aluminum, tri-sec-butylaluminum, tri-tert-butylaluminum, tripentylaluminum, trihexylaluminum, trioctylaluminum, tricyclohexylaluminum, and the like. Among these, preferred are trimethylaluminum and triisobutylaluminum.

The above-described component (C) may be used as a mixture of two or more of them.

The catalyst of the present invention may contain a carrier (D). The carrier (D) is a porous fine particulate carrier, which advantageously is solid in a polymerization medium and selected from inorganic oxides inorganic chlorides, inorganic carbonates, inorganic sulfates or organic polymers.

Examples of the inorganic oxides include inorganic oxides such as $SiO_2$, $Al_2O_3$, MgO, $ZrO_2$, $TiO_2$, and CaO, double oxides such as $SiO_2$—$Al_2O_3$, $SiO_2$—MgO, $SiO_2$—$ZrO_2$, $SiO_2$—$TiO_2$, $SiO_2$—CaO, $Al_2O_3$—MgO, $Al_2O_3$—$ZrO_2$, $Al_2O_3$—$TiO_2$, $Al_2O_3$—CaO, $ZrO_2$—$TiO_2$, $ZrO_2$—CaO, $ZrO_2$—MgO, and $TiO_2$—MgO, inorganic chlorides such as magnesium chloride, inorganic carbonates such as magnesium carbonate, calcium carbonate, and strontium carbonate, and inorganic sulfates such as magnesium sulfate, calcium sulfate, and barium sulfate. As the organic polymer carrier, there can be cited, for example, fine particles of polyethylene, polypropylene, polystyrene, and the like.

Among these, inorganic oxides, particularly $SiO_2$, $Al_2O_3$ and double oxides thereof are preferred.

The average particle diameter of carrier (D) is from 1 to 300 μm, preferably from 10 to 200 μm, and more preferably from 20 to 100 μm. Its specific surface area is within the ranges of preferably from 10 to 1,000 m²/g, more preferably from 100 to 800 m²/g, and particularly preferably from 200 to 600 m²/g. Its pore volume is within the ranges of preferably from 0.3 to 3 cm³/g, more preferably from 0.5 to 2.5 cm³/g, and particularly preferably from 1.0 to 2.0 cm³/g.

The $SiO_2$, $Al_2O_3$ and their double oxide which are preferable as the carrier (D) will have varied amounts of water adsorbed and of surface hydroxyl groups depending on the conditions of treatment. Preferred ranges thereof are a water content of 5% by weight or less and a surface hydroxyl group content per surface area of 1 group/(nm)². To control the water content and surface hydroxyl group content can be carried out by selection of the temperature and time of calcination and treatment with an organic aluminum compound, an organic boron compound or the like.

In the olefin polymerization catalyst of the present invention, it is desirable that at least one of the components (A) and (B) is carried by the carrier (D). The method of carrying is not limited particularly and there can be used, for example, (1) a method in which at least one of the components (A) and (B) is mixed with the carrier (D), (2) a method in which the carrier (D) treated with the component (C) or a halogen-containing silicon compound is mixed with at least one of the component (A) and (B), (3) a method in which the carrier (D), the component (A) and/or component (B), and the component (C) or halogen-containing silicon compound are allowed to react, (4) a method in which after the component (A) or component (B) is carried on the carrier (D), the carrier (D) is mixed with the component (B) or component (A), (5) a method in which the contact reaction product of the components (A) and (B) is contacted with the carrier (D), or (6) a method in which upon contact reaction between the components (A) and (B), the carrier (D) is made to coexist.

In the reactions (4), (5) and (6) above, the component (C) may be added.

The carrying of at least one of the components (A) and (B) on the carrier (D) may be performed in an inert hydrocarbon solvent. More specifically, there may be used aromatic hydrocarbons such as benzene, toluene, and xylene, aliphatic hydrocarbons such as pentane, hexane, heptane, octane, and decane, alicyclic hydrocarbons such as cyclopentane and cyclohexane, and the like. Preferred are aromatic hydrocarbon solvents. The temperature at which contact is made is usually from −50 to 200° C., preferably from −20 to 100° C., and more preferably from 0 to 50° C. The contact time is on the order of from 0.05 to 200 hours, preferably from 0.2 to 20 hours.

The components (A) and (B) in the olefin polymerization catalyst of the present invention may be contacted in the presence of monomers or in the absence of monomers in advance or may be separately introduced into the polymerization system without the contacting in advance.

Further, the order of contacting can be selected freely but when the components (A-1) and (A-2) are used in combination, the method is preferred in which the component (A-1) be contacted with the component (B), followed by contacting the component (A-2).

This contact is carried out in an inert solvent. As the solvent to be used here, there can be used, for example, aromatic hydrocarbons such as benzene, toluene, and xylene, aliphatic hydrocarbons such as pentane, hexane, heptane, octane, and decane, alicyclic hydrocarbons such as cyclopentane and cyclohexane, and the like.

The proportion of the components (A) and (B) to be contacted, [A]/[B-1], where [B-1] is the mole number of aluminum atoms in the component (B-1) used as the component (B) and [A] is the mole number of the component (A), is within the ranges of from 1/1 to 1/10,000, preferably from 1/10 to 1/1,000. When the component (B-2) (or component (B-2')) is used as the component (B), the proportion of the components (A) and (B) to be contacted, [A]/[B-2], where [B-2] is the mole number of the boron atoms therein, is within the ranges of from 10/1 to 1/100, preferably from 2/1 to 1/10.

Further, the proportion of the components (A) and (C) to be used by mole ((A):(C)) is preferably within the ranges of from 1:10 to 1:100,000, and more preferably from 1:100 to 1:10,000.

As for the proportion of the components (B) and (D), when the component (B-1) is used, the weight ratio ((B-1):(A)) is preferably within the ranges of from 1:0.5 to 1:100, and more preferably from 1:1 to 1:10 and when the component (B-2) (or the component (B-2') is used, the weight ratio ((B-2):(D))is within the ranges of from 1:1 to 1:10,000 and more preferably from 1:5 to 1:100.

As for the proportion of the components (A) and (D) to be used, the weight ratio ((A):(D)) is within the ranges of preferably from 1:5 to 1:10,000, and more preferably from 1:10 to 1:500.

The contacting of the catalyst components at the time of polymerization reaction is performed in an aromatic hydrocarbon such as benene, toluene, or xylene, an aliphatic hydrocarbon such as pentane, hexane, heptane, octane, or decane, or an alicyclic hydrocarbon such as cyclopentane or cyclohexane, in the presence of or in the absence of olefins. The temperature at which the contacting is performed is from −70° C. to 200° C., preferably from −20° C. to 120° C. and the mixing time is from 1 to 60 minutes.

The timing of the contacting of the respective catalyst components can be selected freely.

For example, a method can be cited in which the component obtained by contacting the components (A) and (B) in advance is added in a reactor in which the component (C) and an olefin to be provided for polymerization are charged before polymerization reaction can be started. Alternatively, the component (C) and an olefin to be provided for polymerization reaction may be charged in a reactor and the components (A) and (B) may be added separately before polymerization reaction can be started.

Use of the method of the present invention allows homopolymerization of ethylene and copolymerization of ethylene with other α-olefins.

Examples of the α-olefins which can be used in the copolymerization include olefins, cyclic olefins, and dienes, such as propylene, 1-butene, 1-pentene, 1-hexene, 1-heptene, 1-octene, 1-decene, 4-methyl-1-pentene, cyclopentene, cyclopentadiene, butadiene, 1,5-hexadiene, 1,4-hexadiene, and 1,4-pentadiene. Mixtures of two or more of these comonomers may be used in copolymerization with ethylene.

The polymerization method used in the present invention may be any of solution polymerization, slurry polymerization, and gas phase polymerization. Preferred are slurry polymerization and gas phase polymerization, and multi-step polymerization is also possible. Prepolymerization of olefins is also possible.

The amount of polymerization catalyst used in the production method for polyolefin according to the present invention as a concentration of is desirably within the ranges of usually from $10^{-8}$ to $10^{-2}$ mol/l, preferably $10^{-7}$ to $10^{-3}$ mol/l. There is no particular limitation to the pressure of olefin in the reaction system but is within the ranges of preferably from atmospheric pressure to 50 kg/cm$^2$G.

The polymerization temperature is not limited particularly but is within the ranges of preferably from −30° C. to 200° C. Particularly preferably, it is within the ranges of from 0° C. to 120° C. More preferably, it is from 50 to 90° C. Molecular weight control upon the polymerization can be carried out by known means, for example, selection of temperature or introduction of hydrogen.

The (co)polymer obtained by the method of the present invention has the following characteristics.

Firstly, it has a wide molecular weight range. That is, the products obtained have an MFR at 190° C. and under a load of 21.6 kg of 0 g/10 minutes to an MFR at 190° C. and under a load of 2.16 kg of 10,000 g/10 minutes depending on the type of the transition metal compound in the catalyst components, polymerization temperature or the amount of hydrogen introduced at the time of polymerization.

Secondly, it has a wide molecular weight distribution. That is, Mw/Mn as calculated by gel permeation chromatography (GPC) is from about 4 to about 30. However, a very small amount of low molecular weight component causes substantially no smoking at the time of molding.

Thirdly, high melt tension results in excellent moldability.

BEST MODE FOR CARRYING OUT THE INVENTION

Next, the present invention will be described concretely by examples, i.e., reference examples, examples, and comparative examples. In the examples below, analytical appliances used for property measurement are as follows.

NMR was measured at 30° C. in deuterochloroform using EX-400 machine manufactured by Nippon Denshi Co., Ltd.

MFR (melt flow rate) was measured under the conditions of a temperature of 190° C. and a load of 2.16 kg according to JISK-6760 and HLMFR (high load melt flow rate) was measured under the conditions of a load of 21.6 kg.

MT (melt tension) was measured on polymer powder as a measuring sample using a MT measuring instrument manufactured by Toyo Seiki Co., Ltd. under the conditions of a resin temperature of 190° C., an extrusion rate of 15 mm/minute, a winding rate of 6.5 m/minute, a nozzle diameter of 2.095 mm, and a nozzle length of 8 mm.

Molecular weights (Mn, Mw, Mz) and molecular weight distributions (Mw/Mn, Mz/Mw) were measured using GPC (150C manufactured by Waters Co., Ltd., Column:Shodex)

The cyclohexane-soluble component fraction of the polymer (less soluble component indicating less low molecular weight component) was obtained by extracting about 5 g of polymer with 200 ml of cyclohexane using a Soxhlet extractor for 4 hours, measuring the weight of cyclohexane-insoluble portion, and calculating by deducing the weight of the cyclohexane-insoluble portion from the weight of the polymer charged to obtain an amount of soluble component, dividing the amount of soluble component by the amount of polymer charged, and multiplying the resulting quotient by 100 (unit: wt %).

REFERENCE EXAMPLE 1

Preparation of Aluminoxane

In a 500 ml flask sufficiently purged with nitrogen was charged 125 ml of dry toluene, to which 6.3 g of aluminum sulfate tetradecahydrate was suspended. After cooling to −20° C., 75 mmol (75 ml of a 1.0 mol/l toluene solution) of trimethylaluminum was added over 50 minutes and the temperature was elevated to 80° C., followed by stirring for 7 hours. Thereafter, aluminum sulfate compound was removed under nitrogen atmosphere to recover 185 ml of a 0.37 mol/l methylaluminoxane toluene solution.

REFERENCE EXAMPLE 2

Carrying of Aluminoxane on a Carrier

In a 200 ml flask sufficiently purged with nitrogen were charged 50 ml of toluene and 3.0 g of silica (Debison 952 calcined at 400° C. for 4 hours). To the suspension was added 72 ml of the above-described methylaluminoxane (0.37 mol/l (calculated as Al atom) toluene solution) and the mixture was stirred at room temperature for 30 minutes. Thereafter, the solvent was distilled off under reduced pressure to obtain a solid component. The solid component contained 33 wt % of aluminoxane.

EXAMPLE 1

Synthesis of (pentamethylcyclopentadienyl)(N,N'-bis(phenyl)benzamidinato)zirconium dichloride (PPBZ)

In a 100 ml vessel sufficiently purged with nitrogen was charged 1.1 g (4 mmol) of diphenylbenzamidine, which then was dissolved with 50 ml of dry toluene. To the solution was slowly dripped 2.5 ml of n-butyllithium (1.6 mol/l hexane solution) under ice cooling and then the mixture was stirred at room temperature for 3 hours to obtain a toluene solution of lithium N,N'-bis(phenyl)benzamidinato.

A 200 ml vessel sufficiently purged with nitrogen was separately provided to which was charged 1.3 g (4 mmol) of pentamethylcyclopentadienylzirconium trichloride, which was then dissolved with 50 ml of dry toluene. To this was added the total amount of the lithium N,N'-bis(phenyl) benzamidinato toluene solution at room temperature and the mixture was immediately stirred for 5 hours, followed by separation of insoluble components in the reaction mixture by centrifugation. After concentrating the solution portion to a volume of 15 ml, 7 ml of dry hexane was added thereto and left to stand at −20° C. for 10 hours to obtain 1.6 g of target (pentamethylcyclopentadienyl)(N,N'-bis(phenyl) benzamidinato)zirconium dichloride (PPBZ) as pale yellow crystals (Yield 70%).

$^1$H-NMR(CDCl$_3$):δ 7.14–6.89 (15H, m, arom. H), 2.14 (15H, s, Me).

EXAMPLE 2

Synthesis of (pentamethylcyclopentadienyl) (N,N'-bis(4-fluorophenyl)benzamidinato)zirconium dichloride (PFBZ)

Under argon atmosphere, there was charged in a 100 ml vessel bis(4-fluorophenyl)benzamidine (4.5 mmol), which then was dissolved with toluene (50 ml). To the solution was slowly dripped 1.6 M n-butyllithium hexane solution (4.6 mmol) under ice cooling and then the mixture was stirred at room temperature for 3 hours to obtain a toluene solution of lithium N,N'-bis(4-fluorophenyl)benzamidinato.

A 100 ml vessel was separately provided to which was charged under argon atmosphere pentamethylcyclopentadienylzirconium trichloride (4.5 mmol), which was then dissolved with toluene (50 ml). To this was added the total amount of the lithium N,N'-bis(4-fluorophenyl) benzamidinato toluene solution at room temperature and the mixture was immediately stirred for 5 hours at room temperature.

The insoluble components in the reaction mixture were removed by centrifugation and then the reaction mixture was concentrated to 10 ml. To this was added hexane (5 ml) and the mixture was left to stand in a freezer at −20° C. After standing overnight, there was obtained target (pentamethylcyclopentadienyl)(N,N'-bis(4-fluorophenyl) benzamidinato)zirconium dichloride (pale yellow crystals).

$^1$H-NMR(CDCl$_3$): δ 7.26–6.75 (13H, m, arom. H), 2.13 (15H, s, Me).

EXAMPLE 3

Synthesis of bis(N,N'-bis(phenyl)benzamidinato) zirconium dichloride (BPBZ)

Under argon atmosphere, there was charged in a 100 ml vessel diphenylbenzamidine (5.0 mmol), which then was dissolved with toluene (60 ml). To the solution was slowly dripped 1.6 M n-butyllithium hexane solution (5.0 mmol) under ice cooling and then the mixture was stirred at room temperature for 3 hours to obtain a toluene solution of lithium N,N'-bis(phenyl)benzamidinato.

A 300 ml vessel was separately provided to which was charged under argon atmosphere zirconium tetrachloride (2.5 mmol), which was then dissolved with toluene (60 ml). To this was added the total amount of the lithium N,N'-bis (phenyl)benzamidinato toluene solution at room temperature and the mixture was stirred for 5 hours at room temperature.

The insoluble components in the reaction mixture were removed by centrifugation and then the reaction mixture was concentrated to 100 ml. The mixture was left to stand in a freezer at −20° C. overnight. Thereafter, there was obtained target bis(N,N'-bis(phenyl)benzamidinato)zirconium dichloride (yellow crystals).

$^1$H-NMR(CDCl$_3$): δ 7.42–6.81 (30H, m, arom. H).

EXAMPLE 4

Synthesis of (pentamethylcyclopentadienyl)(N,N'-bis(phenyl)naphthamidinato)zirconium dichloride (PPNZ)

Under argon atmosphere, there was charged in a 100 ml vessel diphenylnaphthamidine (8.6 mmol), which then was dissolved with toluene (50 ml). To the solution was slowly dripped 1.6 M n-butyllithium hexane solution (8.6 mmol) under ice cooling and then the mixture was stirred at room temperature for 3 hours to obtain a toluene solution of lithium N,N'-bis(phenyl)naphthamidinato. A 300 ml vessel was separately provided to which was charged under argon atmosphere pentamethylcyclopentadienylzirconium trichloride (8.6 mmol), which was then dissolved with toluene (50 ml). To this was added the total amount of the lithium N,N'-bis(phenyl) naphthamidinato toluene solution at room temperature and the mixture was stirred at room temperature for 30 minutes and at 80° C. for 2 hours. The insoluble components in the reaction mixture were removed by centrifugation and then the reaction mixture was concentrated and the mixture was left to stand in a freezer at −20° C. After standing overnight, there was obtained target (pentamethylcyclopentadienyl)(N,N'-bis(phenyl) naphthamidinato)zirconium dichloride as pale yellow crystals.

$^1$H-NMR(CDCl$_3$): δ 8.34–7.12 (17H, m, arom. H), 2.59 (15H, s, Me).

EXAMPLE 5

Synthesis of (pentamethylcyclopentadienyl)(N,N'-bis(naphthyl)benzamidinato)zirconium dichloride (PNBZ)

Under argon atmosphere, there was charged in a 100 ml vessel dinaphthylbenzamidine (6.7 mmol), which then was dissolved with toluene (50 ml). To the solution was slowly dripped 1.6 M n-butyllithium hexane solution (6.7 mmol) under ice cooling and then the mixture was stirred at room temperature for 3 hours to obtain a toluene solution of lithium N,N'-bis(naphthyl)benzamidinato. A 300 ml vessel was separately provided to which was charged under argon atmosphere pentamethylcyclopentadienylzirconium trichloride (6.7 mmol), which was then dissolved with toluene (50 ml). To this was added the total amount of the lithium N,N'-bis(naphthyl) benzamidinato toluene solution at room temperature and the mixture was stirred at room temperature for 30 minutes and at 80° C. for 2 hours. The insoluble components in the reaction mixture were removed by centrifugation and then the reaction mixture was concentrated and the mixture was left to stand in a freezer at −20° C. After standing overnight, there was obtained target (pentamethylcyclopentadienyl)(N,N'-bis(naphthyl) benzamidinato)zirconium dichloride as pale yellow crystals.

$^1$H-NMR(CDCl$_3$): δ 8.27–6.56 (19H, m, arom. H), 2.16 (15H, s, Me).

EXAMPLE 6

Synthesis of (pentamethylcyclopentadienyl)(N,N'-bis(2,6-dimethylphenyl)benzamidinato)zirconium dichloride (PMBZ)

Under argon atmosphere, there was charged in a 100 ml vessel 1.6 g (5 mmol) of bis(2,6-dimethylphenyl)

benzamidine, which then was dissolved with 50 ml of toluene. To the solution was slowly dripped 3.0 ml of n-butyllithium (1.6 mol/l hexane solution) under ice cooling and then the mixture was stirred at room temperature for 3 hours to obtain a toluene solution of lithium N,N'-bis(2,6-dimethylphenyl)benzamidinato. A 200 ml vessel sufficiently purged with argon was separately provided to which was charged 1.6 g (5 mmol) of pentamethylcyclopentadienylzirconium trichloride, which was then dissolved with 50 ml of dry toluene. To this was added the total amount of the lithium N,N'-bis(2,6-dimethylphenyl) benzamidinato toluene solution at room temperature and the mixture was immediately stirred 5 hours. Thereafter, the insoluble components in the reaction mixture were removed by centrifugation. After the solution portion was concentrated to a volume of 15 ml, 7 ml of dry hexane was added thereto and the mixture was left to stand in a freezer at −20° C. for 8 hours to obtain 1.3 g of target (pentamethylcyclopentadienyl)(N,N'-bis(2,6-dimethylphenyl)benzamidinato)zirconium dichloride as pale yellow crystals.

$^1$H-NMR(CDCl$_3$): δ 7.10–6.80 (11H, m, arom. H), 2.22 (12H, s, Ph-Me), 2.03 (15H, s, Cp-Me).

EXAMPLE 7

In a SUS made autoclave having an inner volume of 1.5 liters sufficiently purged with nitrogen were charged 500 ml of purified toluene, 28 ml of the aluminoxane (MAO) toluene suspension prepared in Reference Example 1 above, and 10 ml of a toluene solution (1.0 mmol/l) of (pentamethylcyclopentadienyl)(N,N'-bis(phenyl) benzamidinato)zirconium dichloride (PPBZ) prepared in Example 1. Then, after the temperature was elevated to 70° C. while stirring, ethylene was introduced to start polymerization. During the polymerization, ethylene was introduced continuously so that the inner pressure of the autoclave was fixed to a constant value of 10 kg/cm$^2$ and the polymerization was carried out at 70° C. for 10 minutes. After the reaction was completed, the catalyst components were decomposed in 3 liters of hydrochloric acid methanol, and the reaction mixture was filtered to obtain polyethylene, which was then dried. As a result, 13.0 g of polyethylene was obtained. The activity per complex was 780 g polyethylene/mmol of complex·hr·atm. The MFR at 190° C. and under a load of 2.16 kg of the polyethylene could not be measured since the flow of polyethylene was not observable.

EXAMPLE 8

Polymerization was carried out in the same manner as in Example 7 except that instead of (pentamethylcyclopentadienyl) (N,N'-bis(phenyl) benzamidinato)zirconium dichloride (PPBZ) was used the bis(N,N'-bis(phenyl)benzamidinato)zirconium dichloride (BPBZ) prepared in Example 3. As a result, 8.7 g of polyethylene was obtained. The activity per complex was 522 g polyethylene/mmol of complex-hr-atm. The MFR at 190° C. and under a load of 2.16 kg of the polyethylene could not be measured since the flow of polyethylene was not observable.

COMPARATIVE EXAMPLE 1

Polymerization was carried out in the same manner as in Example 7 except that instead of (pentamethylcyclopentadienyl) (N,N'-bis(phenyl) benzamidinato)zirconium dichloride (PPBZ) was used (cyclopentadienyl)(N,N'-bis(trimethylsilyl)benzamidinato) zirconium dichloride (CSBZ). As a result, 2.2 g of polyethylene was obtained. The activity per complex was 132 g polyethylene /mmol of complex·hr·atm.

COMPARATIVE EXAMPLE 2

Polymerization was carried out in the same manner as in Example 7 except that instead of (pentamethylcyclopentadienyl) (N,N'-bis(phenyl) benzamidinato)zirconium dichloride (PPBZ) was used bis (cyclopentadienyl)zirconium dichloride (BCZ). As a result, 18.5 g of polyethylene was obtained. The activity per complex was 1,110 g polyethylene/mmol of complex·hr·atm. The polyethylene had a MFR at 190° C. and under a load of 2.16 kg of 0.5 g/10 minutes.

COMPARATIVE EXAMPLE 3

Polymerization was carried out in the same manner as in Example 7 except that instead of (pentamethylcyclopentadienyl) (N,N'-bis(phenyl) benzamidinato)zirconium dichloride (PPBZ) was used bis (N,N'-bis(trimethylsilyl)benzamidinato) zirconium dichloride (BSBZ). As a result, 0.9 g of polyethylene was obtained. The activity per complex was 54 g polyethylene/mmol of complex·hr·atm.

| | Ex. 7 | Ex. 8 | C. Ex. 1 | C. Ex. 2 | C. Ex. 3 |
|---|---|---|---|---|---|
| Component (A-1) | PPBZ | BPBZ | CSBZ | BCZ | BSBZ |
| Component (B-1) + Carrier (D) | MAO | ← | ← | ← | ← |
| Component (B-2) | None | ← | ← | ← | ← |
| Component (C) | None | ← | ← | ← | ← |
| Pressure of ethylene | 10 kg/cm$^2$ | ← | ← | ← | ← |
| Yield (g) | 13.0 | 8.7 | 2.2 | 18.5 | 0.9 |
| Catalyst activity | 780 | 522 | 132 | 1,110 | 54 |
| MFR (g/10 min.) | Unmeasurable | Unmeasurable | — | 0.5 | — |

EXAMPLE 9

In a SUS made autoclave having an inner volume of 1.5 liters sufficiently purged with nitrogen were charged 500 ml of purified toluene, 28 ml of the aluminoxane (MAO) toluene suspension (350 mmol/l) prepared in Reference Example 1 above, 2 ml of a hexane solution (0.5 mol/l) of triisobutylaluminum (TBA) and 2 ml of a toluene solution (1.0 mmol/l) of (pentamethylcyclopentadienyl) (N,N'-bis (phenyl)benzamidinato) zirconium dichloride (PPBZ) prepared in Example 1 in that order. Then, after the temperature was elevated to 70° C. while stirring, ethylene was introduced to start polymerization. During the polymerization, ethylene was introduced continuously so that the inner pressure of the autoclave was fixed to a constant value of 10 kg/ cm$^2$ and the polymerization was carried out at 70° C. for 10 minutes. After the reaction was completed, the catalyst components were decomposed in 3 liters of hydrochloric acid methanol, and the reaction mixture was filtered to obtain polyethylene, which was then dried. As a result, 17 g of polyethylene was obtained. The activity per complex was 5,100 g polyethylene/mmol of complex·hr·atm. The MFR at 190° C. and under a load of 2.16 kg of the polyethylene could not be measured since the flow of polyethylene was not observable.

COMPARATIVE EXAMPLE 4

Polymerization was carried out in the same manner as in Example 9 except that instead of (pentamethylcyclopentadienyl) (N,N'-bis(phenyl) benzamidinato) zirconium dichloride (PPBZ) was used (pentamethylcyclopentadienyl) (N,N'-bis(trimethylsilyl) benzamidinato)zirconium dichloride (PSBZ). As a result, 4 g of polyethylene was obtained. The activity per complex was 1,200 g polyethylene/mmol of complex·hr·atm.

|  | Ex. 9 | C. Ex. 4 |
|---|---|---|
| Component (A-1) | PPBZ | PSBZ |
| Component (B-1) + Carrier (D) | MAO | ← |
| Component (B-2) | None | ← |
| Component (C) | TBA | ← |
| Pressure of ethylene | 10 kg/cm$^2$ | ← |
| Yield (g) | 17 | 4 |
| Catalyst activity | 5,100 | 1,200 |
| MFR (g/10 min.) | Unmeasurable | Unmeasurable |

EXAMPLE 10

In a SUS made autoclave having an inner volume of 1.5 liters sufficiently purged with nitrogen were charged 2 ml of a hexane solution (500 mmol/l) of triisobutylaluminum (TBA) and 800 ml of isobutane and the temperature was elevated to 70° C. while stirring. After applying an ethylene partial pressure of 10 kg/cm$^2$, there was added a mixed solution obtained by contacting 3.1 ml of the hexane suspension (45 mg/ml) of aluminoxane (MAO)-carried solid component (carried type MAO) prepared in Reference Example 2 above and 2 ml of a toluene solution (1.0 mmol/l) of (pentamethylcyclopentadienyl)(N,N'-bis(phenyl) benzamidinato)zirconium dichloride (PPBZ) prepared in Example 1 for 1 minute to start polymerization. During the polymerization, ethylene was introduced continuously so that the ethylene partial pressure in the autoclave was fixed to a constant value of 10 kg/cm$^2$. After the polymerization was carried out at 70° C. for 10 minutes, the polymerization was stopped by purging. As a result, 80 g of polyethylene was obtained. The activity per complex was 8,000 g polyethylene/mmol of complex·hr·atm. The MFR at 190° C. and under a load of 2.16 kg of the polyethylene could not be measured since the flow of polyethylene was not observable. The molecular weight Mw by GPC was 3,400,000.

EXAMPLE 11

Polymerization was carried out in the same manner as in Example 10 except that instead of triisobutylaluminum (TBA) was used butylethylmagnesium (BEM) and that instead of (pentamethylcyclopentadienyl)(N,N'-bis(phenyl) benzamidinato)zirconium dichloride (PPBZ) was used the (pentamethylcyclopentadienyl)(N,N'-bis(phenyl) naphthamidinato)zirconium dichloride (PPNZ) prepared in Example 4. As a result, 76 g of polyethylene was obtained. The activity per complex was 7,600 g polyethylene/mmol of complex·hr·atm. The MFR at 190° C. and under a load of 2.16 kg of the polyethylene could not be measured since the flow of polyethylene was not observable. The molecular weight Mw by GPC was 3,430,000.

EXAMPLE 12

Polymerization was carried out in the same manner as in Example 11 except that instead of (pentamethylcyclopentadienyl)(N,N'-bis(phenyl) benzamidinato)zirconium dichloride (PPBZ) was used the (pentamethylcyclopentadienyl)(N,N'-bis(naphthyl) benzamidinato)zirconium dichloride (PNBZ) prepared in Example 5. As a result, 85 g of polyethylene was obtained. The activity per complex was 8,500 g polyethylene/mmol of complex·hr·atm. The MFR at 190° C. and under a load of 2.16 kg of the polyethylene could not be measured since the flow of polyethylene was not observable. The molecular weight Mw by GPC was 3,500,000.

COMPARATIVE EXAMPLE 5

Polymerization was carried out in the same manner as in Example 10 except that instead of (pentamethylcyclopentadienyl)(N,N'-bis(phenyl) benzamidinato)zirconium dichloride (PPBZ) was used (pentamethylcyclopentadienyl)(N,N'-bis-(trimethylsilyl) benzamidinato)zirconium dichloride (PSBZ). As a result, 19 g of polyethylene was obtained. The activity per complex was 1,900 g polyethylene/mmol of complex·hr·atm. The MFR at 190° C. and under a load of 2.16 kg of the polyethylene could not be measured since the flow of polyethylene was not observable.

|  | Ex. 10 | Ex. 11 | Ex. 12 | C. Ex. 5 |
|---|---|---|---|---|
| Component (A-1) | PPBZ | PPNZ | PNBZ | PSBZ |
| Component (B-1) + Carrier (D) | Carried MAO | ← | ← | ← |
| Component (B-2) | None | ← | ← | ← |
| Component (C) | TBA | BEM | ← | TBA |
| Pressure of ethylene | 10 kg/cm$^2$ | ← | ← | ← |
| Yield(g) | 80 | 76 | 85 | 19 |
| Cataiyst activity | 8,000 | 7,600 | 8,500 | 1,900 |
| MFR (g/10 min.) | Unmeasurable | Unmeasurable | Unmeasurable | — |
| Mw | 3,400,000 | 3,430,000 | 3,500,000 | — |

EXAMPLE 13

Polymerization was carried out in the same manner as in Example 10 except that a mixed gas of hydrogen and ethylene (hydrogen/ethylene: weight ratio 3×10$^{-4}$ wt %) was used. As a result, 71 g of polyethylene was obtained. The activity per complex was 7,100 g polyethylene/mmol of complex·hr·atm. The MFR at 190° C. and under a load of 2.16 kg of the polyethylene was 0.08 g/10 minutes. The HLMFR under a load of 21.6 kg of the polyethylene was 1.73 g/10 minutes. The molecular weight Mw by GPC was 320,000.

COMPARATIVE EXAMPLE 6

Polymerization was carried out in the same manner as in Example 10 except that instead of (pentamethylcyclopentadienyl)(N,N'-bis(phenyl)benzamidinato)zirconium dichloride (PPBZ) was used bis(cyclopentadienyl)zirconium dichloride (BCZ) and that a mixed gas of hydrogen and ethylene (hydrogen/ethylene: weight ratio 1×10$^{-4}$ wt %) was used. As a result, 68 g of polyethylene was obtained. The activity per complex was 6,800 g polyethylene/mmol of complex·hr·atm. The MFR at 190° C. and under a load of 2.16 kg of the polyethylene was 11 g/10 minutes. The HLMFR under a load of 21.6 kg of the polyethylene was 222 g/10 minutes. The molecular weight Mw by GPC was 82,000.

|  | Ex. 13 | C. Ex. 6 |
|---|---|---|
| Component (A-1) | PPBZ | PSBZ |
| Component (B-1) + Carrier (D) | Carried MAO | ← |
| Component (B-2) | None | ← |
| Component (C) | TBA | ← |
| $H_2/C_2H_4$ (weight ratio) | $3 \times 10^{-4}$ | $1 \times 10^{-4}$ |
| Yield (g) | 71 | 68 |
| Catalyst activity | 7,100 | 6,800 |
| MFR (g/10 min.) | 0.08 | 11 |
| HLMFR (g/10 min.) | 1.73 | 222 |
| Mw | 320,000 | 82,000 |

EXAMPLE 14

In a SUS made autoclave having an inner volume of 1.5 liters sufficiently purged with nitrogen were charged 2 ml of a hexane solution (500 mmol/l) of triisobutylaluminum (TBA) and 800 ml of isobutane and the temperature was elevated to 70° C. while stirring. After applying an ethylene partial pressure of 10 kg/cm², there was added a mixed solution obtained by contacting 1 ml of the hexane solution (500 mmol/ml) of triisobutylaluminum (TBA), 2 ml of a toluene solution (1.0 mmol/l) of (pentamethylcyclopentadienyl)(N,N'-bis(phenyl)benzamidinato)zirconium dichloride (PPBZ) prepared in Example 1, and 3 ml of a toluene solution (1.0 mmol/l) of triphenylcarbeniumtetrakis(pentafluorophenyl)borate (TPB) for 5 minutes to start polymerization. During the polymerization, ethylene was introduced continuously so that the ethylene partial pressure in the autoclave was fixed to a constant value of 10 kg/cm². After the polymerization was carried out at 70° C. for 10 minutes, the polymerization was stopped by purging. As a result, 25 g of polyethylene was obtained. The activity per complex was 7,500 g polyethylene/mmol of complex·hr·atm. The MFR at 190° C. and under a load of 2.16 kg of the polyethylene could not be measured since the flow of polyethylene was not observable.

COMPARATIVE EXAMPLE 7

Polymerization was carried out in the same manner as in Example 14 except that instead of (pentamethylcyclopentadienyl)(N,N'-bis(phenyl)benzamidinato)zirconium dichloride (PPBZ) was used (pentamethylcyclopentadienyl)(N,N'-bis(trimethylsilyl)benzamidinato)zirconium dichloride (PSBZ). As a result, 7 g of polyethylene was obtained. The activity per complex was 2,100 g polyethylene/mmol of complex·hr·atm. The MFR at 190° C. and under a load of 2.16 kg of the polyethylene could not be measured since the flow of polyethylene was not observable.

|  | Ex. 14 | C. Ex. 7 |
|---|---|---|
| Component (A-1) | PPBZ | PSBZ |
| Component (B-1) + Carrier (D) | None | ← |
| Component (B-2) | TPB | ← |
| Component (C) | TBA | ← |
| Pressure of ethylene | 10 kg/cm² | ← |
| Yield (g) | 25 | 7 |
| Catalyst activity | 7,500 | 2,100 |
| MFR (g/10 min.) | Unmeasurable | Unmeasurable |

EXAMPLE 15

In a SUS made autoclave having an inner volume of 1.5 liters sufficiently purged with nitrogen were charged a mixed solution of 1 ml of a hexane solution (500 mmol/l) of triisobutylaluminum (TBA) and 1 ml of a hexane solution (500 mmol/l) of butylethylmagnesium (BEM) and 800 ml of isobutane and the temperature was elevated to 70° C. while stirring. After applying an ethylene partial pressure of 10 kg/cm², there was added a mixed solution obtained by contacting 3.1 ml of the hexane suspension (45 mg/ml) of aluminoxane-carried solid component (carried-type MAO) prepared in Reference Example 2 and 4 ml of a toluene solution (1.0 mmol/l) of (pentamethylcyclopentadienyl)(N,N'-bis(phenyl)benzamidinato)zirconium dichloride (PPBZ) prepared in Example 1 for 1 minute to start polymerization. During the polymerization, ethylene was introduced continuously so that the ethylene partial pressure in the autoclave was fixed to a constant value of 10 kg/cm². After the polymerization was carried out at 70° C. for 30 minutes, the polymerization was stopped by purging. As a result, 56 g of polyethylene was obtained. The activity per complex was 2,800 g polyethylene/mmol of complex·hr·atm. The MFR at 190° C. and under a load of 2.16 kg of the polyethylene could not be measured since the flow of polyethylene was not observable. The molecular weight Mw by GPC was 3,620,000.

EXAMPLE 16

Polymerization was carried out in the same manner as in Example 15 except that instead of (pentamethylcyclopentadienyl)(N,N'-bis(phenyl)benzamidinato)zirconium dichloride (PPBZ) was used (pentacyclopentadienyl)(N,N'-bis(4-fluorophenyl)benzamidinato)zirconium dichloride (PFBZ). As a result, 61 g of polyethylene was obtained. The activity per complex was 3,500 g polyethylene/mmol of complex·hr·atm. The MFR at 190° C. and under a load of 2.16 kg of the polyethylene could not be measured since the flow of polyethylene was not observable. The molecular weight Mw by GPC was 3,320,000.

EXAMPLE 17

Polymerization was carried out in the same manner as in Example 15 except that instead of the mixed solution of 1 ml of a hexane solution (500 mmol/l) of triisobutylaluminum (TBA) and 1 ml of a hexane solution (500 mmol/l) of butylethyl magnesium (BEM) was used a mixed solution of 1 ml of a hexane solution (500 mmol/l) of triisobutylaluminum (TBA) and 1 ml of a hexane solution (500 mmol/l) of n-butyllithium (BL). As a result, 53 g of polyethylene was obtained. The activity per complex was 2,350 g polyethylene/mmol of complex·hr·atm. The MFR at 190° C. and under a load of 2.16 kg of the polyethylene could not be measured since the flow of polyethylene was not observable. The molecular weight Mw by GPC was 3,500,000.

COMPARATIVE EXAMPLE 8

Polymerization was carried out in the same manner as in Example 15 except that instead of (pentamethylcyclopentadienyl)(N,N'-bis(phenyl)benzamidinato)zirconium dichloride (PPBZ) was used (pentamethylcyclopentadienyl)(N,N'-bis(trimethylsilyl)benzamidinato)zirconium dichloride (PSBZ). As a result, 10 g of polyethylene was obtained. The activity per complex was 500 g polyethylene/mmol of complex·hr·atm. The MFR at 190° C. and under a load of 2.16 kg of the polyethylene could not be measured since the flow of polyethylene was not observable.

COMPARATIVE EXAMPLE 9

Polymerization was carried out in the same manner as in Example 15 except that instead of (pentamethylcyclopentadienyl)(N,N'-bis(phenyl) benzamidinato)zirconium dichloride (PPBZ) was used bis (cyclopentadienyl)zirconium dichloride (BCZ). As a result, 60.5 g of polyethylene was obtained. The activity per complex was 3,030 g polyethylene/mmol of complex·hr·atm. The MFR at 190° C. and under a load of 2.16 kg of the polyethylene was 0.9 g/10 minutes. The molecular weight Mw by GPC was 250,000.

triisobutylaluminum (TBA) and 1 ml of a hexane solution (500 mmol/l) of butylethylmagnesium (BEM), 50 g of 1-hexene, and 800 ml of isobutane and the temperature was elevated to 70° C. while stirring. After applying an ethylene partial pressure of 10 kg/cm², there was added a mixed solution obtained by contacting 3.1 ml of the hexane suspension (45 mg/ml) of aluminoxane-carried solid component (carried-type MAO) prepared in Reference Example 2

|  | Ex. 15 | Ex. 16 | Ex. 17 | C. Ex. 8 | C. Ex. 9 |
|---|---|---|---|---|---|
| Component (A-1) | PPBZ | PFBZ | PPBZ | PSBZ | BCZ |
| Component (B-1) + Carrier (D) | Carried MAO | ← | ← | ← | ← |
| Component (B-2) | None | ← | ← | ← | ← |
| Component (C) | TBA + BEM | ← | TBA + BL | TBA + BEM | ← |
| Pressure of ethylene | 10 kg/cm² | ← | ← | ← | ← |
| Yield (g) | 56 | 61 | 53 | 10 | 60.5 |
| Catalyst activity | 2,800 | 3,500 | 2,350 | 500 | 3,030 |
| MFR (g/10 min.) | Unmeasurable | Unmeasurable | Unmeasurable | Unmeasurable | 0.9 |
| Mw | 3,620,000 | 3,320,000 | 3,500,000 | — | 250,000 |

EXAMPLE 18

Polymerization was carried out in the same manner as in Example 15 except that instead of (pentamethylcyclopentadienyl)(N,N'-bis(phenyl) benzamidinato)zirconium dichloride (PPBZ) was used the bis(N,N'-bis(phenyl)benzamidinato)zirconium dichloride (BPBZ) prepared in Example 3. As a result, 26 g of polyethylene was obtained. The activity per complex was 1,300 g polyethylene/mmol of complex·hr·atm. The MFR at 190° C. and under a load of 2.16 kg of the polyethylene could not be measured since the flow of polyethylene was not observable.

COMPARATIVE EXAMPLE 10

Polymerization was carried out in the same manner as in Example 15 except that instead of (pentamethylcyclopentadienyl)(N,N'-bis(phenyl) benzamidinato)zirconium dichloride (PPBZ) was used bis (N,N'-bis(trimethylsilyl)benzamidinato)zirconium dichloride (BSBZ). As a result, 5 g of polyethylene was obtained. The activity per complex was 250 g polyethylene/mmol of complex·hr·atm. The MFR at 190° C. and under a load of 2.16 kg of the polyethylene could not be measured since the flow of polyethylene was not observable.

|  | Ex. 18 | C. Ex. 10 |
|---|---|---|
| Component (A-1) | BPBZ | BSBZ |
| Component (B-1) + Carrier (D) | Carried MAO | ← |
| Component (B-2) | None | ← |
| Component (C) | TBA + BEM | ← |
| Pressure of ethylene | 10 kg/cm² | ← |
| Yield (g) | 26 | 5 |
| Catalyst activity | 1,300 | 250 |
| MFR (g/10 min.) | Unmeasurable | Unmeasurable |
| Mw | — | — |

EXAMPLE 19

In a SUS made autoclave having an inner volume of 1.5 liters sufficiently purged with nitrogen were charged a mixed solution of 1 ml of a hexane solution (500 mmol/l) of and 4 ml of a toluene solution (1.0 mmol/l) of (pentamethylcyclopentadienyl)(N,N'-bis(phenyl) benzamidinato)zirconium dichloride (PPBZ) prepared in Example 1 for 1 minute to start polymerization. During the polymerization, ethylene was introduced continuously so that the ethylene partial pressure in the autoclave was fixed to a constant value of 10 kg/cm². After the polymerization was carried out at 70° C. for 30 minutes, the polymerization was stopped by purging. As a result, 45 g of polyethylene was obtained. The activity per complex was 2,250 g polyethylene/mmol of complex·hr·atm. The MFR at 190° C. and under a load of 2.16 kg of the polyethylene could not be measured since the flow of polyethylene was not observable.

EXAMPLE 20

Polymerization was carried out in the same manner as in Example 19 except that instead of the mixed solution of 1 ml of a hexane solution (500 mmol/l) of triisobutylaluminum (TBA) and 1 ml of a hexane solution (500 mmol/l) of butylethylmagnesium (BEM) was used 2 ml of a hexane solution (500 mmol/l) of butylethylmagnesium (BEM). As a result, 37 g of polyethylene was obtained. The activity per complex was 3,700 g polyethylene/mmol of complex·hr·atm. The MFR at 190° C. and under a load of 2.16 kg of the polyethylene could not be measured since the flow of polyethylene was not observable. The molecular weight Mw by GPC was 1,840,000.

COMPARATIVE EXAMPLE 11

Polymerization was carried out in the same manner as in Example 19 except that instead of (pentamethylcyclopentadienyl)(N,N'-bis(phenyl) benzamidinato)zirconium dichloride (PPBZ) was used (pentamethylcyclopentadienyl)(N,N'-bis(trimethylsilyl) benzamidinato)zirconium dichloride (PSBZ). As a result, 4 g of polyethylene was obtained. The activity per complex was 200 g polyethylene/mmol of complex·hr·atm. The MFR at 190° C. and under a load of 2.16 kg of the polyethylene could not be measured since the flow of polyethylene was not observable.

|  | Ex. 19 | Ex. 20 | C. Ex. 11 |
| --- | --- | --- | --- |
| Component (A-1) | PPBZ | ← | PSBZ |
| Component (B-1) + Carrier (D) | Carried MAO | ← | ← |
| Component (B-2) | None | ← | ← |
| Component (C) | TBA + BEM | BEM | TBA + BEM |
| Pressure of ethylene | 10 kg/cm$^2$ | ← | ← |
| Yield (g) | 45 | 37 | 4 |
| Catalyst activity | 2,250 | 3,700 | 200 |
| MFR (g/10 min.) | Unmeasurable | Unmeasurable | Unmeasurable |
| Mw | — | 1,840,000 | — |

EXAMPLE 21

In a SUS made autoclave having an inner volume of 1.5 liters sufficiently purged with nitrogen were charged 0.9 ml of a hexane solution (0.5 mol/l) of triisobutylaluminum (TBA) and 800 ml of isobutane and the temperature was elevated to 70° C. Then, a mixed gas of ethylene and hydrogen (H$_2$/C$_2$ (molar ratio)=4×10$^{-5}$) was introduced so that its partial pressure was 10 kg/cm$^2$ and there was added a three-component mixed solution consisting of 3.0 ml of the toluene solution (0.37 mol/l) of methylaluminoxane prepared in Reference Example 1 above, a solution of 0.5 mg of bis(n-butylcyclopentadienyl)zirconium dichloride in 2.5 ml of hexane, and a solution of 2.2 mg of (pentamethylcyclopentadienyl)(N,N'-bis(phenyl)benzamidinato)zirconium dichloride (PPBZ) prepared in Example 1 in 5.0 ml of toluene was injected with nitrogen at a pressure of 40 kg/cm$^2$ to start polymerization. Polymerization carried out at 70° C. for 30 minutes under a mixed gas pressure of 10 kg/cm$^2$ gave 122 g of polyethylene.

The polyethylene had a MFR at 190° C. and under a load of 2.16 kg of 0.52 g/10 minutes, a ratio of HLMFR at 190° C. and under a load of 21.6 kg to MFR at 190° C. and under a load of 2.16 kg (HLMFR/MFR) of 92.2, Mw/Mn of 9.8, a melt tension of 7.1 g, and a cyclohexane-soluble component fraction of 0.7 wt %.

EXAMPLE 22

In a SUS made autoclave having an inner volume of 1.5 liters sufficiently purged with nitrogen were charged 0.9 ml of a hexane solution (0.5 mol/l) of triisobutylaluminum (TBA) and 800 ml of isobutane and the temperature was elevated to 70° C. Then, a mixed gas of ethylene and hydrogen (H$_2$/C$_2$ (molar ratio)=4×10$^{-5}$) was introduced so that its partial pressure was 10 kg/cm$^2$ and there was added a three-component mixed solution consisting of a solution of 180 mg of methylaluminoxane carried on silica prepared in Reference Example 2 above, a solution of 0.5 mg of bis(n-butylcyclopentadienyl)zirconium dichloride in 2.5 ml of hexane, and a solution of 2.2 mg of (pentamethylcyclopentadienyl)(N,N'-bis(phenyl)benzamidinato)zirconium dichloride (PPBZ) prepared in Example 1 in 5.0 ml of toluene was injected with nitrogen at a pressure of 40 kg/cm$^2$ to start polymerization. Polymerization carried out at 70° C. for 30 minutes under a mixed gas pressure of 10 kg/cm$^2$ gave 145 g of polyethylene.

The polyethylene had a MFR at 190° C. and under a load of 2.16 kg of 0.50 g/10 minutes, a ratio of HLMFR at 190° C. and under a load of 21.6 kg to MFR at 190° C. and under a load of 2.16 kg (HLMFR/MFR) of 90.5, Mw/Mn of 9.6, a melt tension of 7.6 g, and a cyclohexane-soluble component fraction of 0.7 wt %.

EXAMPLE 23

The same procedures as in Example 21 were repeated except that instead of 0.9 ml of the hexane solution (0.5 mol/l) of triisobutylaluminum (TBA) was used 0.9 ml of a hexane solution of a mixture of butylethylmagnesium (BEM) and triisobutylaluminum (TBA) (mixing molar ratio [Mg]/[Al]=1/1, prepared by stirring in hexane at 20° C. for 30 minutes, a total concentration being 0.5 mol/l).

The polyethylene had a MFR at 190° C. and under a load of 2.16 kg of 0.57 g/10 minutes, a ratio of HLMFR at 190° C. and under a load of 21.6 kg to MFR at 190° C. and under a load of 2.16 kg (HLMFR/MFR) of 91.3, Mw/Mn of 10.1, a melt tension of 7.5 g, and a cyclohexane-soluble component fraction of 0.6 wt %.

EXAMPLE 24

In a SUS made autoclave having an inner volume of 1.5 liters sufficiently purged with nitrogen were charged 0.9 ml of a hexane solution of a mixture of butylethylmagnesium (BEM) and triisobutylaluminum (TBA) (mixing molar ratio [Mg]/[Al]=1/1, prepared by stirring in hexane at 20° C. for 30 minutes, a total concentration being 0.5 mol/l) and 800 ml of isobutane and the temperature was elevated to 70° C. Then, a mixed gas of ethylene and hydrogen (H$_2$/C$_2$ (molar ratio)=7×10$^{-5}$) was introduced so that its partial pressure was 10 kg/cm$^2$ and there was added a three-component mixed solution consisting of a solution of 180 mg of methylaluminoxane carried on silica prepared in Reference Example 2 above, 0.5 mg of bis(n-butylcyclopentadienyl)zirconium dichloride in 2.5 ml of hexane and a solution of 2.2 mg of (pentamethylcyclopentadienyl)(N,N'-bis(phenyl)benzamidinato)zirconium dichloride (PPBZ) prepared in Example 1 in 5.0 ml of toluene was injected with nitrogen at a pressure of 40 kg/cm$^2$ to start polymerization. Polymerization carried out at 70° C. for 30 minutes under a mixed gas pressure of 10 kg/cm$^2$ gave 160 g of polyethylene.

The polyethylene had a MFR at 190° C. and under a load of 2.16 kg of 0.57 g/10 minutes, a ratio of HLMFR at 190° C. and under a load of 21.6 kg to MFR at 190° C. and under a load of 2.16 kg (HLMFR/MFR) of 90.1, Mw/Mn of 10.0, a melt tension of 7.3 g, and a cyclohexane-soluble component fraction of 0.8 wt %.

EXAMPLE 25

The same procedures as in Example 24 were repeated except that instead of the three-component mixed solution consisting of a solution of 180 mg of methylaluminoxane carried on silica prepared in Reference Example 2 above, 0.5 mg of bis(n-butylcyclopentadienyl)zirconium dichloride in 2.5 ml of hexane and a solution of 2.2 mg of (pentamethylcyclopentadienyl)(N,N'-bis(phenyl)benzamidinato)zirconium dichloride (PPBZ) prepared in Example 1 in 5.0 ml of toluene was used a three-component mixed solution consisting of a solution of 180 mg of methylaluminoxane carried on silica, 0.5 mg of bis(n-butylcyclopentadienyl)zirconium dichloride in 2.5 ml of hexane and a solution of 5.2 mg of (pentamethylcyclopentadienyl)(N,N'-bis(phenyl)benzamidinato)zirconium dichloride (PPBZ) in 5.0 ml of toluene. As a result, 128 g of polyethylene was obtained.

The polyethylene had a MFR at 190° C. and under a load of 2.16 kg of 0.47 g/10 minutes, a ratio of HLMFR at 190° C. and under a load of 21.6 kg to MFR at 190° C. and under a load of 2.16 kg (HLMFR/MFR) of 95.3, Mw/Mn of 10.9, a melt tension of 7.7 g, and a cyclohexane-soluble component fraction of 0.4 wt %.

EXAMPLE 26

The same procedures as in Example 24 were repeated except that instead of the three-component mixed solution consisting of a solution of 180 mg of methylaluminoxane carried on silica prepared in Reference Example 2 above, 0.5 mg of bis(n-butylcyclopentadienyl) zirconium dichloride in 2.5 ml of hexane and a solution of 2.2 mg of (pentamethylcyclopentadienyl)(N,N'-bis(phenyl) benzamidinato)zirconium dichloride (PPBZ) prepared in Example 1 in 5.0 ml of toluene was used a three-component mixed solution consisting of a solution of 90 mg of methylaluminoxane carried on silica, 0.25 mg of bis(n-butylcyclopentadienyl)zirconium dichloride in 2.5 ml of hexane and a solution of 2.6 mg of (pentamethylcyclopentadienyl)(N,N'-bis(phenyl) benzamidinato)zirconium dichloride (PPBZ) in 5.0 ml of toluene and that instead of the mixed gas of ethylene and hydrogen ($H_2/C_2$ (molar ratio)=$7\times10^{-5}$) was used a mixed gas of ethylene and hydrogen ($H_2/C_2$ (molar ratio)=$4\times10^{-5}$). As a result, 78 g of polyethylene was obtained.

The polyethylene had a MFR at 190° C. and under a load of 2.16 kg of 0.15 g/10 minutes, a ratio of HLMFR at 190° C. and under a load of 21.6 kg to MFR at 190° C. and under a load of 2.16 kg (HLMFR/MFR) of 176.2, Mw/Mn of 8.9, a melt tension of 11.7 g, and a cyclohexane-soluble component fraction of 0.2 wt %.

EXAMPLE 27

The same procedures as in Example 24 were repeated except that instead of the three-component mixed solution consisting of a solution of 180 mg of methylaluminoxane carried on silica prepared in Reference Example 2 above, 0.5 mg of bis(n-butylcyclopentadienyl) zirconium dichloride in 2.5 ml of hexane and a solution of 2.2 mg of (pentamethylcyclopentadienyl)(N,N'-bis(phenyl) benzamidinato)zirconium dichloride (PPBZ) prepared in Example 1 in 5.0 ml of toluene was used a three-component mixed solution consisting of a solution of 90 mg of methylaluminoxane carried on silica, 0.25 mg of bis(n-butylcyclopentadienyl)zirconium dichloride in 2.5 ml of hexane and a solution of 3.7 mg of (pentamethylcyclopentadienyl)(N,N'-bis(phenyl) benzamidinato)zirconium dichloride (PPBZ) in 5.0 ml of toluene and that instead of the mixed gas of ethylene and hydrogen ($H_2/C_2$ (molar ratio)=$7\times10^{-5}$) was used a mixed gas of ethylene and hydrogen ($H_2/C_2$ (molar ratio)=$4\times10^{-5}$). As a result, 101 g of polyethylene was obtained.

The polyethylene had a MFR at 190° C. and under a load of 2.16 kg of 0.03 g/10 minutes, a ratio of HLMFR at 190° C. and under a load of 21.6 kg to MFR at 190° C. and under a load of 2.16 kg (HLMFR/MFR) of 259.1, Mw/Mn of 13.0, a melt tension of 19.8 g, and a cyclohexane-soluble component fraction of 0.2 wt %.

EXAMPLE 28

The same procedures as in Example 24 were repeated except that instead of the three-component mixed solution consisting of a solution of 180 mg of methylaluminoxane carried on silica prepared in Reference Example 2 above, 0.5 mg of bis(n-butylcyclopentadienyl) zirconium dichloride in 2.5 ml of hexane and a solution of 2.2 mg of (pentamethylcyclopentadienyl)(N,N'-bis(phenyl) benzamidinato)zirconium dichloride (PPBZ) prepared in Example 1 in 5.0 ml of toluene was used a three-component mixed solution consisting of a solution of 180 mg of methylaluminoxane carried on silica, 0.5 mg of bis(n-butylcyclopentadienyl) zirconium dichloride in 2.5 ml of hexane and a solution of 7.4 mg of (pentamethylcyclopentadienyl)(N,N'-bis(phenyl) benzamidinato)zirconium dichloride (PPBZ) in 5.0 ml of toluene and that instead of the mixed gas of ethylene and hydrogen ($H_2/C_2$ (molar ratio)=$7\times10^{-5}$) was used a mixed gas of ethylene and hydrogen ($H_2/C_2$ (molar ratio)=$6\times10^{-5}$). As a result, 165 g of polyethylene was obtained.

The polyethylene had a MFR at 190° C. and under a load of 2.16 kg of 0.03 g/10 minutes, a ratio of HLMFR at 190° C. and under a load of 21.6 kg to MFR at 190° C. and under a load of 2.16 kg (HLMFR/MFR) of 261.2, Mw/Mn of 14.3, a melt tension of 17.8 g, and a cyclohexane-soluble component fraction of 0.2 wt %.

EXAMPLE 29

In a SUS made autoclave havin g an inner volume of 1.5 liters sufficiently purged with nitrogen were charged 150 g of sodium chloride sufficiently dried to remove moisture and 0. 9 ml of a hexane solution (0.5 mol/l) of triisobutylaluminum (TBA) and the temperature was elevated to 70 oC while stirring. Then, a mixed gas of ethylene and hydrogen ($H_2/C_2$ (molar ratio)=$4\times10^{-5}$) was introduced so that its total pressure was 10 kg/cm² and there was added a three-component mixed solution consisting of a solution of 6 mg of triphenylcarbeniumtetrakis(pentafluorophenyl) borate (TPB) in 5 ml of toluene, a solution of 0.5 mg of bis(n-butylcyclopentadienyl)zirconium dichloride in 2.5 ml of hexane and a solution of 2.2 mg of (pentamethylcyclopentadienyl)(N,N'-bis(phenyl) benzamidinato)zirconium dichloride (PPBZ) prepared in Example 1 in 5.0 ml of toluene was injected with nitrogen at a pressure of 40 kg/cm to start polymerization. Polymerization was carried out at 70° C. for 30 minutes under a mixed gas pressure of 10 kg/cm². After completion of the polymerization, the contents were transferred into a vessel in which 2 liters of water containing a small amount of hydrochloric acid was charged in order to remove sodium chloride, and as a result 105 g of polyethylene was obtained.

The polyethylene had a MFR at 190° C. and under a load of 2.16 kg of 0.49 g/10 minutes, a ratio of HLMFR at 190° C. and under a load of 21. 6 kg to MFR at 190° C. and under a load of 2.16 kg (HLMFR/MFR) of 90.8, Mw/Mn of 10.8, a melt tension of 7.7 g, and a cyclohexane-soluble component fraction of 0.7 wt %.

EXAMPLE 30

Polymerization was carried out in the same manner as in example 24 except that instead of 2.2 mg of (pentamethylcyclopentadienyl)(N,N'-bis(phenyl) benzamidinato)zirconium dichloride (PPBZ) was used 2.3 g of (pentamethylcyclopentadienyl)(N,N'-bis(2,6-dimethylphenyl)benzamidinato)zirconium dichloride (PMBZ) prepared in Example 6. As a result, 148 g of polyethylene was obtained.

The polyethylene had a MFR at 190° C. and under a load of 2.16 kg of 0.53 g/10 minutes, a ratio of HLMFR at 190° C. and under a load of 21.6 kg to MFR at 190° C. and under a load of 2.16 kg (HLMFR/MFR) of 90.8, Mw/Mn of 10.5, a melt tension of 7.5 g, and a cyclohexane-soluble component fraction of 0.4 wt %.

EXAMPLE 31

In a SUS made autoclave having an inner volume of 1.5 liters sufficiently purged with nitrogen were charged 0.9 ml of a hexane solution of a mixture of butylethylmagnesium (BEM) and triisobutylaluminum (TBA) (mixing molar ratio [Mg]/[Al]=1/1, prepared by stirring in hexane at 20° C. for 30 minutes, a total concentration being 0.5 mol/l) and 800 ml of isobutane and the temperature was elevated to 70° C. Then, ethylene was introduced so that its partial pressure was 10 kg/cm$^2$ and there was added a three-component mixed solution consisting of a solution of 180 mg of methylaluminoxane carried on silica prepared in Reference Example 2 above, 0.6 mg of dimethylsilylenebis(n-butylcyclopentadienyl)zirconium dichloride in 2.5 ml of hexane and a solution of 4.4 mg of (pentamethylcyclopentadienyl)(N,N'-bis(phenyl)benzamidinato)zirconium dichloride (PPBZ) prepared in Example 1 in 5.0 ml of toluene was injected with nitrogen at a pressure of 40 kg/cm$^2$ to start polymerization. Polymerization carried out at 70° C. for 30 minutes under a mixed gas pressure of 10 kg/cm$^2$ gave 138 g of polyethylene.

The polyethylene had a MFR at 190° C. and under a load of 2.16 kg of 0.11 g/10 minutes, a ratio of HLMFR at 190° C. and under a load of 21.6 kg to MFR at 190° C. and under a load of 2.16 kg (HLMFR/MFR) of 431.3, Mw/Mn of 13.1, a melt tension of 10.3 g, and a cyclohexane-soluble component fraction of 0.6 wt %.

EXAMPLE 32

In a SUS made autoclave having an inner volume of 1.5 liters sufficiently purged with nitrogen were charged 0.9 ml of a hexane solution of a mixture of butylethylmagnesium (BEM) and triisobutylaluminum (TBA) (mixing molar ratio [Mg]/[Al]=1/1, prepared by stirring in hexane at 20° C. for 30 minutes, a total concentration being 0.5 mol/l), 5 g of 1-hexene, and 800 ml of isobutane and the temperature was elevated to 70° C. Then, ethylene was introduced so that its partial pressure was 10 kg/cm$^2$ and there was added a three-component mixed solution consisting of a solution of 180 mg of methylaluminoxane carried on silica prepared in Reference Example 2 above, 0.6 mg of dimethylsilylenebis(n-butylcyclopentadienyl)zirconium dichloride in 2.5 ml of hexane and a solution of 4.4 mg of (pentamethylcyclopentadienyl)(N,N'-bis(phenyl)benzamidinato)zirconium dichloride (PPBZ) prepared in Example 1 in 5.0 ml of toluene was injected with nitrogen at a pressure of 40 kg/cm$^2$ to start polymerization. Polymerization carried out at 70° C. for 30 minutes under a mixed gas pressure of 10 kg/cm$^2$ gave 159 g of polyethylene.

The polyethylene had a MFR at 190° C. and under a load of 2.16 kg of 0.08 g/10 minutes, a ratio of HLMFR at 190° C. and under a load of 21.6 kg to MFR at 190° C. and under a load of 2.16 kg (HLMFR/MFR) of 295.0, Mw/Mn of 13.9, a melt tension of 11.3 g, and a cyclohexane-soluble component fraction of 0.8 wt %.

EXAMPLE 33

In a SUS made autoclave having an inner volume of 1.5 liters sufficiently purged with nitrogen were charged 0.9 ml of a hexane solution of a mixture of butylethylmagnesium (BEM) and triisobutylaluminum (TBA) (mixing molar ratio [Mg]/[Al]=1/1, prepared by stirring in hexane at 20° C. for 30 minutes, a total concentration being 0.5 mol/l), 5 g of 1-hexene, and 800 ml of isobutane and the temperature was elevated to 70° C. Then, ethylene was introduced so that its partial pressure was 10 kg/cm$^2$ and there was added a three-component mixed solution consisting of a solution of 180 mg of methylaluminoxane carried on silica prepared in Reference Example 2 above, 0.5 mg of bis(n-butylcyclopentadienyl)zirconium dichloride in 2.5 ml of hexane and a solution of 4.4 mg of (pentamethylcyclopentadienyl)(N,N'-bis(phenyl)benzamidinato)zirconium dichloride (PPBZ) prepared in Example 1 in 5.0 ml of toluene was injected with nitrogen at a pressure of 40 kg/cm$^2$ to start polymerization. Polymerization carried out at 70° C. for 30 minutes under a mixed gas pressure of 10 kg/cm$^2$ gave 186 g of polyethylene.

The polyethylene had a MFR at 190° C. and under a load of 2.16 kg of 0.22 g/10 minutes, a ratio of HLMFR at 190° C. and under a load of 21.6 kg to MFR at 190° C. and under a load of 2.16 kg (HLMFR/MFR) of 243.6, Mw/Mn of 9.9, a melt tension of 10.3 g, and a cyclohexane-soluble component fraction of 0.4 wt %.

EXAMPLE 34

In a SUS made autoclave having an inner volume of 1.5 liters sufficiently purged with nitrogen were charged 1.6 ml of a hexane solution (0.5 mol/l) of butylethylmagnesium (BEM) and 800 ml of isobutane and the temperature was elevated to 70° C. Then, a mixed gas of ethylene and hydrogen ($H_2/C_2$ (molar ratio)=$4 \times 10^{-5}$) was introduced so that its partial pressure was 10 kg/cm$^2$ and there was added a three-component mixed solution consisting of a solution of 180 mg of methylaluminoxane carried on silica prepared in Reference Example 2 above, 0.5 mg of bis(n-butylcyclopentadienyl)zirconium dichloride in 2.5 ml of hexane and a solution of 2.4 mg of (pentamethylcyclopentadienyl)(N,N'-bis(phenyl)naphthamidinato)zirconium dichloride (PPNZ) prepared in Example 4 in 5.0 ml of toluene was injected with nitrogen at a pressure of 40 kg/cm$^2$ to start polymerization. Polymerization carried out at 70° C. for 30 minutes under a mixed gas pressure of 10 kg/cm$^2$ gave 140 g of polyethylene.

The polyethylene had a MFR at 190° C. and under a load of 2.16 kg of 0.46 g/10 minutes, a ratio of HLMFR at 190° C. and under a load of 21.6 kg to MFR at 190° C. and under a load of 2.16 kg (HLMFR/MFR) of 93.5, Mw/Mn of 10.4, a melt tension of 7.5 g, and a cyclohexane-soluble component fraction of 0.6 wt %.

EXAMPLE 35

In a SUS made autoclave having an inner volume of 1.5 liters sufficiently purged with nitrogen were charged 1.6 ml of a hexane solution (0.5 mol/l) of butylethylmagnesium and 800 ml of isobutane and the temperature was elevated to 70° C. Then, a mixed gas of ethylene and hydrogen ($H_2/C_2$ (molar ratio)=$4 \times 10^{-5}$) was introduced so that its partial pressure was 10 kg/cm$^2$ and there was added a three-component mixed solution consisting of a solution of 180 mg of methylaluminoxane carried on silica prepared in Reference Example 2 above, 0.5 mg of bis(n-butylcyclopentadienyl) zirconium dichloride in 2.5 ml of hexane and a solution of 2.6 mg of (pentamethylcyclopentadienyl)(N,N'-bis(naphthyl)benzamidinato)zirconium dichloride (PNBZ) prepared in Example 5 in 5.0 ml of toluene was injected with nitrogen at a pressure of 40 kg/cm$^2$ to start polymerization. Polymerization carried out at 70° C. for 30 minutes under a mixed gas pressure of 10 kg/cm2 gave 156 g of polyethylene.

The polyethylene had a MFR at 190° C. and under a load of 2.16 kg of 0.42 g/10 minutes, a ratio of HLMFR at 190° C. and under a load of 21.6 kg to MFR at 190° C. and under a load of 2.16 kg (HLMFR/MFR) of 92.2, Mw/Mn of 11.6, a melt tension of 8.3 g, and a cyclohexane-soluble component fraction of 0.6 wt %.

COMPARATIVE EXAMPLE 12

In a SUS made autoclave having an inner volume of 1.5 liters sufficiently purged with nitrogen were charged 0.9 ml of a hexane solution (0.5 mol/l) of triisobutylaluminum (TBA) and 800 ml of isobutane and the temperature was elevated to 70° C. Then, a mixed gas of ethylene and hydrogen ($H_2/C_2$ (molar ratio)=$4 \times 10^{-5}$) was introduced so that its partial pressure was 10 kg/cm² and there was added a three-component mixed solution consisting of a solution of 3.0 ml of a toluene solution (0.37 mol/l) of methylaluminoxane prepared in Reference Example 1 above, 0.5 mg of bis(n-butylcyclopentadienyl)zirconium dichloride in 2.5 ml of hexane and a solution of 1.5 mg of bis(1,3-dimethylcyclopentadienyl)zirconium dichloride in 5.0 ml of toluene was injected with nitrogen at a pressure of 40 kg/cm² to start polymerization. Polymerization carried out at 70° C. for 30 minutes under a mixed gas pressure of 10 kg/cm² gave 142 g of polyethylene.

The polyethylene had a MFR at 190° C. and under a load of 2.16 kg of 1.48 g/10 minutes, a ratio of HLMFR at 190° C. and under a load of 21.6 kg to MFR at 190° C. and under a load of 2.16 kg (HLMFR/MFR) of 76.8, Mw/Mn of 4.2, a melt tension of 2.7 g, and a cyclohexane-soluble component fraction of 0.8 wt %.

Table below shows the results of Examples 21 to 35 and Comparative Example 12.

|  | Ex. 21 | Ex. 22 | Ex. 23 | Ex. 24 | Ex. 25 | Ex. 26 | Ex. 27 | Ex. 28 |
|---|---|---|---|---|---|---|---|---|
| Component (A-1) | PPBZ*[1] | ← | ← | ← | ← | ← | ← | ← |
| Amount | 2.2 mg | ← | ← | ← | 5.2 mg | 2.6 mg | 3.7 mg | 7.4 mg |
| Component (A-2) | BBZ*[2] | ← | ← | ← | ← | ← | ← | ← |
| Amount | 0.5 mg | ← | ← | ← | ← | 0.25 mg | ← | 0.5 mg |
| Comp. (B-1) + Carrier (D) | MAO | Carried MAO | MAO | Carried MAO | ← | ← | ← | ← |
| Amount |  | 180 mg |  | 180 mg | ← | 90 mg | ← | 180 mg |
| Component (B-2) | None | None | None | None | None | None | None | None |
| Component (C) | TBA*[3] | ← | BEM*[4] + TEA | ← | ← | ← | ← | ← |
| $H_2/C_2H_4$ (molar ratio) | $4 \times 10^{-5}$ | ← | ← | $7 \times 10^{-5}$ | ← | $4 \times 10^{-5}$ | ← | $7 \times 10^{-5}$ |
| Yield | 122 g | 145 g | 110 g | 160 g | 128 g | 78 g | 101 g | 165 g |
| MFR (g/10 min.) | 0.52 | 0.50 | 0.57 | 0.57 | 0.47 | 0.15 | 0.03 | 0.03 |
| HLMFR/MFR | 92.2 | 90.5 | 91.3 | 90.1 | 95.3 | 176.2 | 259.1 | 261.2 |
| Mw/Mn | 9.8 | 9.6 | 10.1 | 10.0 | 10.9 | 8.9 | 13.0 | 14.3 |
| Melt tension (MT) | 7.1 g | 7.6 g | 7.5 g | 7.3 g | 7.7 g | 11.7 g | 19.8 g | 17.8 g |
| Cyclohexane-soluble component fraction | 0.7 wt. % | 0.7 wt. % | 0.6 wt. % | 0.8 wt. % | 0.4 wt. % | 0.2 wt. % | 0.2 wt. % | 0.2 wt. % |

*[1]PPBZ (Pentamethylcyclopentadienyl)(N,N'-bis(phenyl)benzamidinato)zirconium dichloride (prepared in Example 1)
*[2]BBZ Bis(n-butylcyclopentadienyl)zirconium dichloride
*[3]TBA Triisobutylaluminum
*[4]BEM Butylethylmagnesium

|  | Ex. 29 | Ex. 30 | Ex. 31 | Ex. 32 | Ex. 33 | Ex. 34 | Ex. 35 | C. Ex. 12 |
|---|---|---|---|---|---|---|---|---|
| Component (A-1) | PPBZ | PMBZ*[5] | PPBZ | ← | ← | PPNZ*[6] | PNBZ*[7] | BMCZ*[8] |
| Amount | 2.2 mg | 2.3 mg | 4.4 mg | ← | ← | 2.4 mg | 2.6 mg | 1.5 mg |
| Component (A-2) | BBZ | ← | SBCZ*[9] | ← | BBZ | ← | ← | ← |
| Amount | 0.5 mg | ← | 0.6 mg | ← | 0.5 mg | ← | ← | ← |
| Comp. (B-1) + Carrier (D) | None | Carried MAO | ← | ← | ← | ← | ← | MAO |
| Amount |  | 180 mg | ← | ← | ← | ← | ← |  |
| Component (B-2) | TPB*[10] | None | None | None | None | None | None | None |
| Component (C) | TBA | BEM + TBA | ← | ← | ← | BEM | ← | TBA |
| $H_2/C_2H_4$ (molar ratio) | $4 \times 10^{-5}$ | $7 \times 10^{-5}$ | (only ethylene) | (ethylene + hexene) | ← | $4 \times 10^{-5}$ | ← | ← |
| Yield | 105 g | 148 g | 138 g | 159 g | 186 g | 140 g | 156 g | 142 g |
| MFR (g/10 min.) | 0.49 | 0.53 | 0.11 | 0.08 | 0.22 | 0.46 | 0.42 | 1.48 |
| HLMFR/MFR | 90.8 | 90.8 | 431.3 | 295.0 | 243.6 | 93.5 | 92.2 | 76.8 |
| Mw/Mn | 10.8 | 10.5 | 13.1 | 13.9 | 9.9 | 10.4 | 11.6 | 4.2 |
| Melt tension (MT) | 7.7 g | 7.5 g | 10.3 g | 11.3 g | 10.3 g | 7.5 g | 8.3 g | 2.7 g |
| Cyclohexane-soluble component fraction | 0.7 wt. % | 0.4 wt. % | 0.6 wt. % | 0.8 wt. % | 0.4 wt. % | 0.6 wt. % | 0.6 wt. % | 0.8 wt. % |

*[5]PMBZ (Pentamethylcyclopentadienyl)(N,N'-bis(2,6-dimethylphenyl)benzamidinato)zirconium dichloride (prepared in Example 6)
*[6]PPNZ (Pentamethylcyclopentadienyl)(N,N'-bis(phenyl)naphthamidinato)zirconium dichloride (prepared in Example 4)
*[7]PNBZ (Pentamethylcyclopentadienyl)(N,N'-bis(naphthyl)benzamidinato)zirconium dichloride (prepared in Example 5)
*[8]BMCZ Bis(1,3-dimethylcyclopentadienyl)zirconium dichloride
*[9]SBCZ Dimethylsilylenebis(n-butylcyclopentadienyl)zirconium dichloride
*[10]TPB Triphenylcarbeniumtetrakis(pentafluorophenyl)borate

What is claimed is:

1. An olefin polymerization catalyst component comprising a transition metal compound represented by formula (1)

 (1)

wherein M is a transition metal atom of Group 4 in a periodic table,

L is a group represented by formula (2)

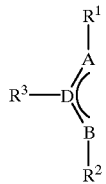 (2)

wherein $R^1$ and $R^2$, which may be the same or different, each represent an aryl group or a substituted aryl group, A and B, which may be the same or different, each represent an atom of Group 15 of the periodic table, D represents an atom of group 14 of the periodic table, $R^3$ represents a hydrogen atom, a halogen atom, an organic metalloid group, an alkoxy group, an amino group, a hydrocarbon group or a hetero atom-containing hydrocarbon group, $C_p$ represents a cyclopentadienyl. group, a substituted cyclopentadienyl group, an indenyl group, a substituted indenyl group, a fluorenyl group, or a substituted fluorenyl group, m is 1 or 2, n is 1 when m is 1 or 0 when m is 2, when m is 1, the L group and the Cp group may be bonded to each other, when m is 2, the L groups may be bonded to each other, $X^1$ and $X^2$, which may be same or different, each represent a hydrogen atom, a halogen atom, an organic metalloid group, an alkoxy group, an amino group, a hydrocarbon group, or a hetero atom-containing hydrocarbon group.

2. A method of producing a polyolefin compound comprising polymerizing olefins in the presence of an olefin polymerization catalyst, wherein said catalyst comprises:

(A-1) a transition metal compound A-1 represented by formula (1),

 (1)

wherein M is a transition metal atom of Group 4 in a periodic table, wherein L is a group represented by formula (2)

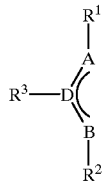 (2)

wherein $R^1$ and $R^2$, which may be the same or different, each represent an aryl group or a substituted aryl group, A and B, which may be the same or different, each represent an atom of Group 15 of the periodic table, D represents an atom of group 14 of the periodic table, $R^3$ represents a hydrogen atom, a halogen atom, an organic metalloid group, an alkoxy group, an amino group, a hydrocarbon group or a hetero atom-containing hydrocarbon group, $C_p$ represents a cyclopentadienyl group, a substituted cyclopentadienyl group, an indenyl group, a substituted indenyl group, fluorenyl group, or a substituted fluorenyl group, m is 1 or 2, n is 1 when m is 1 or 0 when m is 2, when m is 1, the L group and the $C_p$ group may be bonded to each other, when m is 2, the L groups may be bonded to each other, $X^1$ and $X^2$, which may be the same or different, each represent a hydrogen atom, a halogen atom, an organic metalloid group, an alkoxy group, an amino group, a hydrocarbon group, or a hetero atom-containing hydrocarbon group; and (A-2) at least one transition metal compound selected from the group consisting of a transition metal compound A-2a represented by formula (3)

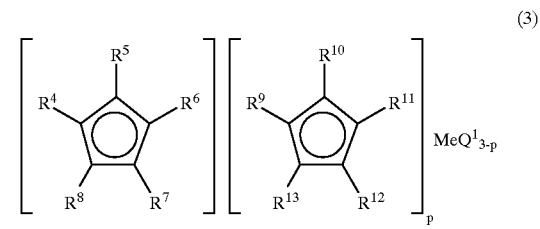 (3)

wherein $R^4$ to $R^{13}$, which may be the same or different, each represent a hydrogen atom, a $C_{1-20}$ hydrocarbon group, a silyl group substituted with 1 to 3 alkyl groups, or a germyl group substituted with 1 to 3 alkyl groups, or two adjacent groups together with the carbon atom to which they are combined form a 4 to 6 member carbocyclic group, a plurality of $Q^1$s, which may be the same or different, each represent a hydrogen atom, a halogen atom, a $C_{1-20}$ hydrocarbon group, an alkoxy group, an aryloxy group, a silyloxy group which may be substituted with 1 to 3 alkyl groups, or a substituted alkyl group containing 1 to 30 carbon atoms of which at least one carbon atom in the skeleton is replaced with an element selected from the group consisting of atoms of Groups 13, 14 and 16 in the periodic table, Me represents a transition metal selected from the group consisting of atoms of Group 3, 4, and 5 in the periodic table, and p is 0 or 1, and A-2b a transition metal compound represented by formula (4)

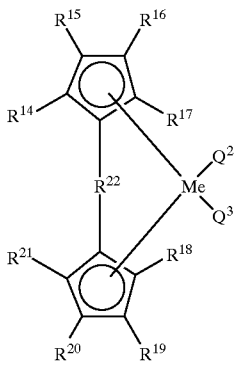

(4)

wherein $R^{14}$ to $R^{21}$, which may be the same or different, each represent a hydrogen atom, a $C_{1-20}$ hydrocarbon group, a silyl group substituted with 1 to 3 alkyl groups, or a germyl group substituted with 1 to 3 alkyl groups, $R^{22}$ represents an alkylene group, an alkylidene group, a cycloalkylidene group in which one of ring forming carbons may be replaced by an oxygen atom, a di-substituted germylene or silylene group, di-substituted with an alkyl group or a phenyl group, $Q^2$ and $Q^3$, which may be the same or different, each represent a hydrogen atom, a halogen atom, a $C_{1-20}$ hydrocarbon group, an alkoxy group, an aryloxy group, a silyloxy group which may be substituted with 1 to 3 alkyl groups, or a substituted alkyl group containing 1 to 30 carbon atoms of which at least one carbon atom in the skeleton is replaced with an element selected from the group consisting of atoms of Groups 13, 14 and 16 in the periodic table, Me represents a transition metal selected from the group consisting of atoms of Group 3, 4, and 5, and (B) at least one compound selected from B-1, an organic aluminum oxy compound, and B-2', a compound which reacts with the transition metal compound represented by a formula (1), (3), or (4) above to form an ion pair.

3. An olefin polymerization catalyst comprising:

(A-1) a transition metal compound A-1 represented by formula (1) described in claim 1, and (A-2) at least one transition metal compound selected from the group consisting of a transition metal compound A-2a represented by formula (3)

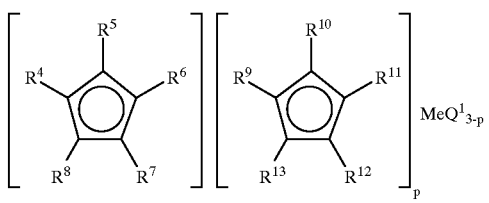

(3)

wherein $R^4$ to $R^{13}$, which may be the same or different, each represent a hydrogen atom, a $C_{1-20}$ hydrocarbon group, a silyl group substituted with 1 to 3 alkyl groups, or a genyl group substituted with 1 to 3 alkyl groups, or two adjacent groups together with the carbon atom to which they are combined form a 4 to 6 member carbocyclic group, a plurality of $Q^1$s, which may be the same or different, each represent a hydrogen atom, a halogen atom, a $C_{1-20}$ hydrocarbon group, an alkoxy group, an aryloxy group, a silyloxy group which may be substituted with 1 to 3 alkyl groups, or a substituted alkyl group containing 1 to 30 carbon atoms of which at least one carbon atom in the skeleton is replaced with an element selected from the group consisting of atoms of Groups 13, 14 and 16 in the periodic table, Me represents a transition metal selected from the group consisting of atoms of Group 3, 4, 5, and 6 in the periodic table, and p is 0 or 1, and (A-2b) a transition metal compound represented by formula (4)

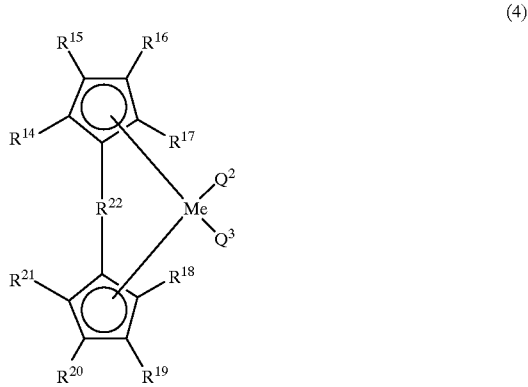

(4)

wherein $R^{14}$ to $R^{21}$, which may be the same or different, each represent a hydrogen atom, a $C_{1-20}$ hydrocarbon group, a silyl group substituted with 1 to 3 alkyl groups, or a germyl group substituted with 1 to 3 alkyl groups, $R^{22}$ represents an alkylene group, an alkylidene group, a cycloalkylidene group in which one of ring forming carbons may be replaced by an oxygen atom, a di-substituted germylene or silylene group, di-substituted with an alkyl group or a phenyl group, $Q^2$ and $Q^3$, which may be the same or different, each represent a hydrogen atom, a halogen atom, a $C_{1-20}$ hydrocarbon group, an alkoxy group, an aryloxy group, a silyloxy group which may be substituted with 1 to 3 alkyl groups, or a substituted alkyl group containing 1 to 30 carbon atoms of which at least one carbon atom in the skeleton is replaced with an element selected from the group consisting of atoms of Groups 13, 14 and 16 in the periodic table, Me represents a transition metal selected from the group consisting of atoms of Group 3, 4, and 5, and (B) at least one compound selected from B-1, an organic aluminum oxy compound, and B-2', a compound which reacts with the transition metal compound represented by a formula (1), (3), or (4) above to form an ion pair.

4. An olefin polymerization catalyst comprising:

(A) a transition metal compound A-1 represented by formula (1) described in claim 1, and (B) at least one compound selected from the group consisting of an organic aluminum oxy compound B-1 and a compound B-2 which reacts with the transition metal compound represented by formula (1) described above to form an ion pair.

5. The olefin polymerization catalyst as claimed in claim 4 or 3, further comprising (C) at least one organic metal compound selected from the group consisting of an organic lithium, an organic magnesium, and an organic aluminum.

6. The olefin polymerization catalyst as claimed in claim 4 or 3, further comprising (D) a carrier.

7. The olefin polymerization catalyst as claimed in claim 4 or 3, further comprising (C) at least one organic metal compound selected from the group consisting of an organic lithium, an organic magnesium, and an organic aluminum and (D) a carrier.

8. A method of producing a polyolcefin compound comprising polymerizing olefins in the presence of an olefin polymerization catalyst wherein said catalyst comprises:

(A) a transition metal compound A-1 represented by formula (1)

and;

(B) at least one compound selected from the group consisting of an organic aluminum oxy compound B-1 and a compound B-2 which reacts with the transition metal compound represented by formula (1) to form an ion pair, wherein M is a transition metal atom of Group 4 in a periodic table, wherein L is a group represented by formula (2)

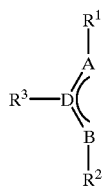

wherein $R^1$ and $R^2$, which may be the same or different, each represent an aryl group or a substituted aryl group,
A and B, which may be the same or different, each represent an atom of Group 15 of the periodic table, D represents an atom of group 14 of the periodic table, $R^3$ represents a hydrogen atom, a halogen atom, an organic metalloid group, an alkoxy group, an amino group, a hydrocarbon group or a hetcro atom-containing hydrocarbon group, $C_p$ represents a cyclopentadienyl group, a substituted cyclopentadienyl group, an indenyl group, a substituted indenyl group, fluorenyl group, or a substituted fluorenyl group, m is 1 or 2, n is 1 when m is 1 or 0 when m is 2, when m is 1, the L group and the $C_p$ group may be bonded to each other, when m is 2, the L groups may be bonded to each other,
$X^1$ and $X^2$, which may be the same or different, each represent a hydrogen atom, a halogen atom, an organic metalloid group, an alkoxy group, an amino group, a hydrocarbon group, or hetero atom-containing hydrocarbon group.

9. A method of producing polyolefin comprising using a catalyst as claimed in claim 8 or 2, wherein said catalyst further comprises (C) at least one organic metal compound selected from the group consisting of an organic lithium, an organic magnesium, and an organic aluminum.

10. A method of producing polyolefin comprising using a catalyst as claimed in claim 8 or 2, wherein said catalyst further comprises (C) at least one organic metal compound selected from the group consisting of an organic lithium, an organic magnesium, and an organic aluminum.

11. A method of producing polyolefin comprising using a catalyst as claimed in claim 8 or 2, wherein said catalyst further comprises (C) at least one organic metal compound selected from the group consisting of an organic lithium, an organic magnesium, and an organic aluminum.

* * * * *